(12) United States Patent
Ludwig et al.

(10) Patent No.: US 9,071,619 B2
(45) Date of Patent: Jun. 30, 2015

(54) HIERARCHICAL CLOSED-LOOP CONTROL OF POLICY, GOAL, AND RESOURCE ALLOCATION IN BANDWIDTH MANAGEMENT USING BOTH SERVICE-SPECIFIC AND NETWORK MONITOR OBSERVATIONS

(71) Applicant: AVISTAR COMMUNICATIONS CORPORATION, San Mateo, CA (US)

(72) Inventors: Lester F. Ludwig, San Antonio, TX (US); Jozef Paul Chris Lauwers, Mountain View, CA (US)

(73) Assignee: Avistar Communications Corporation, San Mateo, CA (US)

( * ) Notice: Subject to any disclaimer, the term of this patent is extended or adjusted under 35 U.S.C. 154(b) by 0 days.

(21) Appl. No.: 14/244,245

(22) Filed: Apr. 3, 2014

(65) Prior Publication Data

US 2014/0211811 A1    Jul. 31, 2014

Related U.S. Application Data

(63) Continuation of application No. 13/693,007, filed on Dec. 3, 2012, now Pat. No. 8,693,500, which is a continuation of application No. 12/814,057, filed on Jun. 11, 2010, now Pat. No. 8,325,763, which is a continuation of application No. 12/198,085, filed on Aug. 25, 2008, now Pat. No. 7,738,492.

(60) Provisional application No. 61/027,417, filed on Feb. 8, 2008, provisional application No. 60/989,027, filed on Nov. 19, 2007.

(51) Int. Cl.
*H04J 3/16* (2006.01)
*H04L 29/06* (2006.01)
*H04L 12/24* (2006.01)
*H04L 12/26* (2006.01)

(52) U.S. Cl.
CPC ........ *H04L 65/1066* (2013.01); *H04L 41/0896* (2013.01); *H04L 43/0876* (2013.01); *H04L 65/1046* (2013.01)

(58) Field of Classification Search
CPC . H04J 3/1682; H04W 74/08; H04W 72/0446; H04W 74/0816; H04L 12/40084; H04L 12/413
USPC ......... 370/468, 462, 443, 447, 431, 401, 389, 370/349, 235, 252, 231, 230, 229, 395.4, 370/395.41, 395.42, 395.43; 709/229
See application file for complete search history.

(56) References Cited

U.S. PATENT DOCUMENTS 7,738,492 B2 * 6/2010 Lauwers et al. ............. 370/468

*Primary Examiner* — Chi H Pham
*Assistant Examiner* — Alexander O Boakye
(74) *Attorney, Agent, or Firm* — TransPacific Law Group; Pavel I. Pogodin, Esq.

(57) ABSTRACT

A Unified Bandwidth Manager that functions as a multi-service bandwidth manager to interface with and hierarchically manage a plurality of service-specific bandwidth reservation and session management systems for at least one associated network resource is described. The Unified Bandwidth Manager includes a hierarchical control structure, and an interface for providing observed information relevant to policy, goal, and observed resource usage to the hierarchical control structure. At least one service-specific observation element and at least one network monitor observation element provide observation information relating to network conditions imposed on and observed in the associated network resource. The hierarchical control structure is provided with a plurality of feedback inputs that are responsive to associated ongoing observation information from each of an associated observation reporting element. The hierarchical control structure uses the plurality of feedback inputs, together with policy information or goal information, to produce at least one element of outgoing control information.

20 Claims, 36 Drawing Sheets

2400

US 9,071,619 B2

HIERARCHICAL CLOSED-LOOP CONTROL OF POLICY, GOAL, AND RESOURCE ALLOCATION IN BANDWIDTH MANAGEMENT USING BOTH SERVICE-SPECIFIC AND NETWORK MONITOR OBSERVATIONS

RELATED APPLICATIONS

This application is a continuation of U.S. patent application Ser. No. 13/693,007, filed Dec. 3, 2012, now U.S. Pat. No. 8,693,500, entitled "Hierarchical Closed-Loop Control of Policy, Goal, and Resource Allocation in Bandwidth Management," which is a continuation of U.S. patent application Ser. No. 12/814,057, filed Jun. 11, 2010, now U.S. Pat. No. 8,325,763, entitled "Aggregated Unified Communication Bandwidth Management System for Control by Human Operator," which is a continuation of U.S. patent application Ser. No. 12/198,085, filed Aug. 25, 2008, now U.S. Pat. No. 7,738,492, entitled "Network Communication Bandwidth Management," which relies on and claims benefit of priority under 35 U.S.C. 119 from U.S. Provisional Patent Application Nos. 60/989,027, filed Nov. 19, 2007, and 61/027,417, filed Feb. 8, 2008, which are all incorporated by reference herein in their entirety.

TECHNICAL FIELD

The disclosed embodiments relate generally to network communications bandwidth management and in particular to unified bandwidth manager that interfaces with and hierarchically manages a plurality of service-specific bandwidth reservation and session management systems.

BACKGROUND

Over many years there has been a number of communication services designed to operate over the internet and other networks, each with special performance requirements for their networked communications. These requirements may include near-real-time delivery, streaming, bandwidth volumes, and so on. Often, these attributes motivate the use of special network protocols and/or bandwidth reservation systems. Such bandwidth reservation systems generally provide the following capabilities:

Protect the amount of bandwidth reserved on the network for real-time and near-real-time communications. In essence, the system takes steps to ensure that the amount of bandwidth required for a call or session is available for the duration of that session to ensure a high quality-of-experience to the end user.

Constrain the amount of bandwidth available for real-time or near-real-time communications to make sure that those communications do not interfere with other traffic on the network. For example, users making video calls shouldn't cause SAP to come to a grinding halt or stop Citrix applications from working.

Police access to available bandwidth by integrating with the signaling infrastructure and implementing strategies for dealing with bandwidth shortage at call setup time.

In many cases, a given bandwidth reservation system pertains only to a particular communication service, or only to a particular communications application, or only to a particular manufacturer's application product line, or even only to a particular manufacturer's application. As a result, there is a proliferation of purpose-specific bandwidth reservation systems being sold by manufacturers and being installed in enterprise networks. We will refer to a purpose-specific bandwidth reservation system and its associated communications application(s) as a Communications Silo. Typical commercial Communications Silos are directed at services such as IP-telephony (also known as Voice over Internet Protocol or VoIP") and video conferencing. The communications silo concept also naturally extends to real-time streaming audio and streaming video enterprise or internet webcast sessions, as well as to playback of recorded streaming audio and streaming video. The concept could also be adapted to other types of web servers, although in many cases wide variations in packet traffic can require additional consideration.

BRIEF DESCRIPTION OF THE DRAWINGS

The aforementioned aspects of the invention as well as additional aspects will be more clearly understood as a result of the following detailed description of the various embodiments of the invention when taken in conjunction with the drawings.

FIG. 20a shows how a single service inverse blocking algorithm can be used with FIGS. 17a and 19a.

FIG. 20b illustrates how a multiple service inverse blocking algorithm can be used with FIGS. 17b and 19b.

Like reference numerals refer to corresponding parts throughout the drawings.

DESCRIPTION OF EMBODIMENTS

In some embodiments, a unified bandwidth manager is described, which provides a unified management infrastructure for all enterprise IP network real-time communications (such as VoIP and video conferencing. In some embodiments, the unified bandwidth manager is capable of spanning enterprise-wide IP communications.

Figure 1:
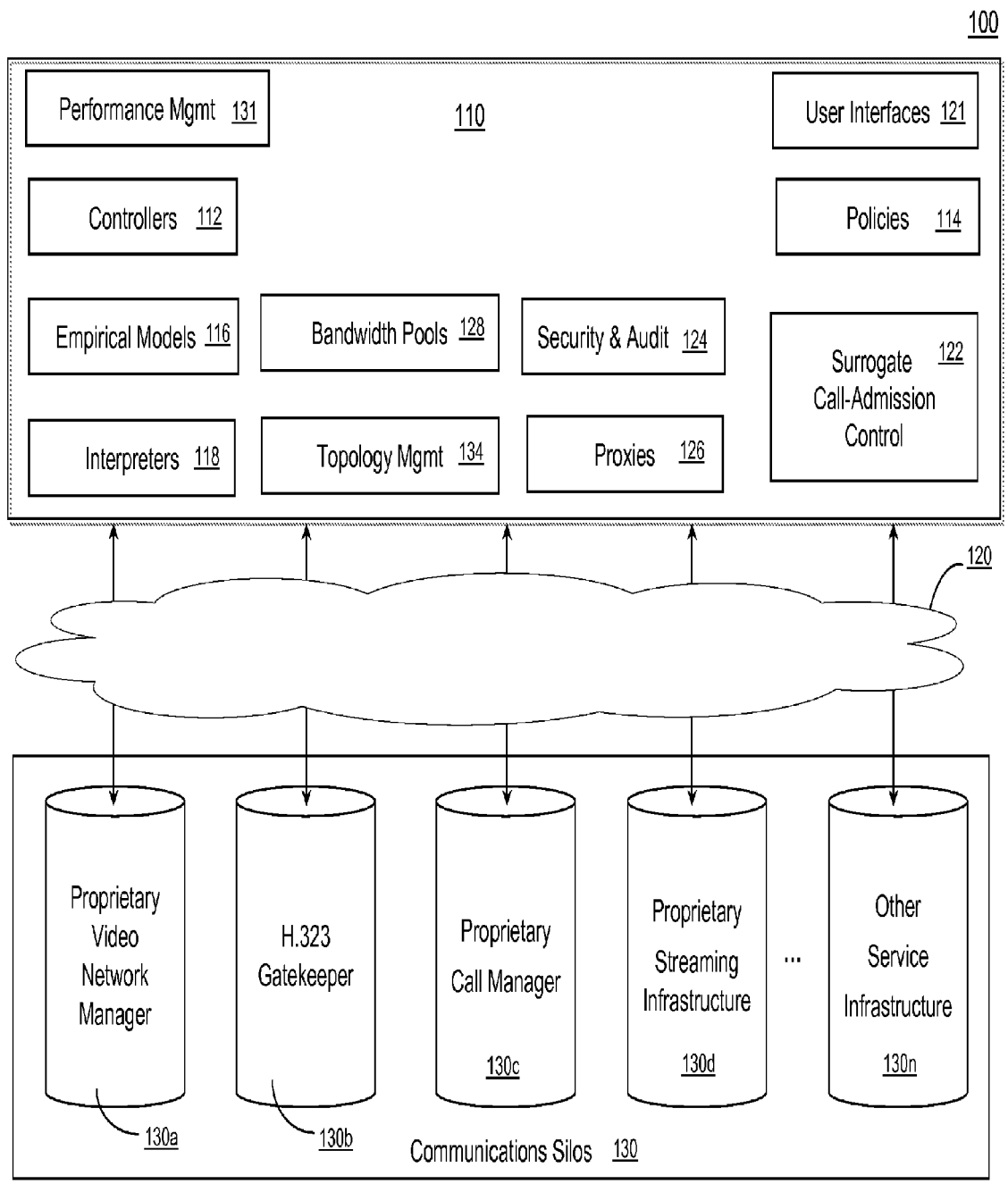
FIG. 1 is a block diagram of a Unified Bandwidth Manager and an enterprise networking environment in which it may operate.

FIG. 1 is a block diagram of an enterprise networking environment 100 including a Unified Bandwidth Manager 110, an enterprise communication network 120, and a plurality of communication silos 130a-130n, each containing a separate service-specific bandwidth reservation system.

Unified Bandwidth Manager 110 interacts with the plurality of bandwidth reservation systems included in the plurality of communication silos 130a-130n. Unified Bandwidth Manager 110 can provide, for example, unified bandwidth management functions that include call admission control functionality for all real-time traffic on enterprise communication network 120, which may include VPNs, Intranets, the Internet, Extranets, and so on. The real-time IP packet traffic may include VoIP, video conferencing, video streaming, e-mail, internet, internal applications, and so on. Unified Bandwidth Manager 110 can also interact with associated network resources relating to other applications.

Unified Bandwidth Manager 110 provides an integration layer atop a plurality of real-time communications technologies—more specifically atop a plurality of bandwidth reservation systems. Depending upon implementation details and available information flows, such an integration layer makes possible a number of functions and features in the areas of administration, bandwidth management, and cost reductions.

Unified Bandwidth Manager 110 interfaces with various outside gatekeeper, manager, and proxy server products and standards. These include, but are not limited to, communications systems built on SIP, H.323 gatekeepers for voice and/or video, VoIP call managers, and Content Delivery Networks.

Unified Bandwidth Manager 110 also provides a common network topology model and associated bandwidth pools, a single interface for administrators to describe their networks, a single interface for administrators to manage real-time communications, and a single interface for deeply-embedded QoS infrastructure.

Unified Bandwidth Manager 110 comprises a hierarchical control environment that is created with a spectrum of interface types, information sources, and heterogeneous types of control parameters. This may be useful because the various commercial bandwidth reservation system products are largely "black boxes" providing one or more of varied levels, types, and forms of controls, internal control systems, information, and internal dynamics. In particular, the internal control systems and internal dynamics will typically not be known. Further, any information provided by the various commercial bandwidth reservation system products, if any is even made available, is quite limited and may comprise a wide range of forms. Thus, Unified Bandwidth Manager 110 may often have to interact with each commercial bandwidth reservation system product on a "take what you can get," "be glad you even get this much," and "as is" basis. Where no measurement information is available, separate network monitoring tools may be introduced to gather raw information for subsequent filtering, sorting, classification, and interpretation. These aspects of the invention are described in conjunction with FIG. 10.

Given this mixed potpourri, interpreters and models are included to convert among disparate types and forms of incoming information, outgoing control signals and outgoing control parameter settings. For example, monitored control packet header and content information can be identified and used to calculate the rate of new call and session requests for one or more types of supported services, the average duration of calls and sessions for these services during a recent interval in time, and other service-specific statistics and attributes that may be useful. These interpreters and models may comprise empirical models made from a priori study and/or run-time estimators and predictors. These are directed to an integrated control environment wherein desired policies and dynamic behaviors are manifest. From all this, new systems and methods and/or known systems and methods (adapted from homogeneous bandwidth reservation systems, classical flow control system, stochastic resource allocation theory, and classical control theory) are then adapted to work with the available information and the provided control offered by the manufacturers of specific bandwidth reservation systems products.

The gathering, translation, interpretation, and integration of the incoming information needed for these functions also provide Unified Bandwidth Manager 110 with an integrated "view" of the enterprise network's operation. Unified Bandwidth Manager 110 can provide a single view and entry point into the configuration of call admission control and bandwidth management of multiple real-time communication technologies. Unified Bandwidth Manager 110 can provide visibility into all real-time communications traffic on the network at all times and provides single access point to capture and record all real-time communications traffic.

Topology and Routing Management

Unified Bandwidth Manager 110 can be implemented to provide for bandwidth reservation and bandwidth management that employs a model of the underlying network topology managed by the Topology Management module 134. Such a network topology model serves as the master topology reference that can be used to facilitate provisioning and enforcement of bandwidth constraints for each of the communication silos 130 that are managed by the Unified Bandwidth Manager 110.

Conceptually, this network topology model comprises Sites, Links, Clouds, and the intrinsic attributes associated with each. Sites represent locations within the enterprise network that comprise "high-bandwidth" buildings, campus, and/or metropolitan networks. For purposes of bandwidth reservation and bandwidth management, it is may be useful to structure the network topology model so that uniform bandwidth is available between any two endpoints contained within a Site, i.e., there are no communications bottlenecks between endpoints that do not exist between other endpoints within the same Site. In some cases, this may require a particular building or campus to be modeled as a linked cluster of Sites.

Clouds provide a mechanism to model any-to-any wide-area networks such as the Internet, MPLS clouds, managed VPN clouds, etc that can be used to interconnect a plurality of Sites.

Links include those network interconnections between Sites or between Sites and Clouds that have "limited-bandwidth," such as, WAN facilities among the buildings, campus, metropolitan networks, ISP, and so on Links are used to model the bandwidth bottlenecks between high-bandwidth Sites and Clouds Links could represent leased line interconnections, frame-relay or ATM circuits, VPN connections, and so on.

Figure 30:
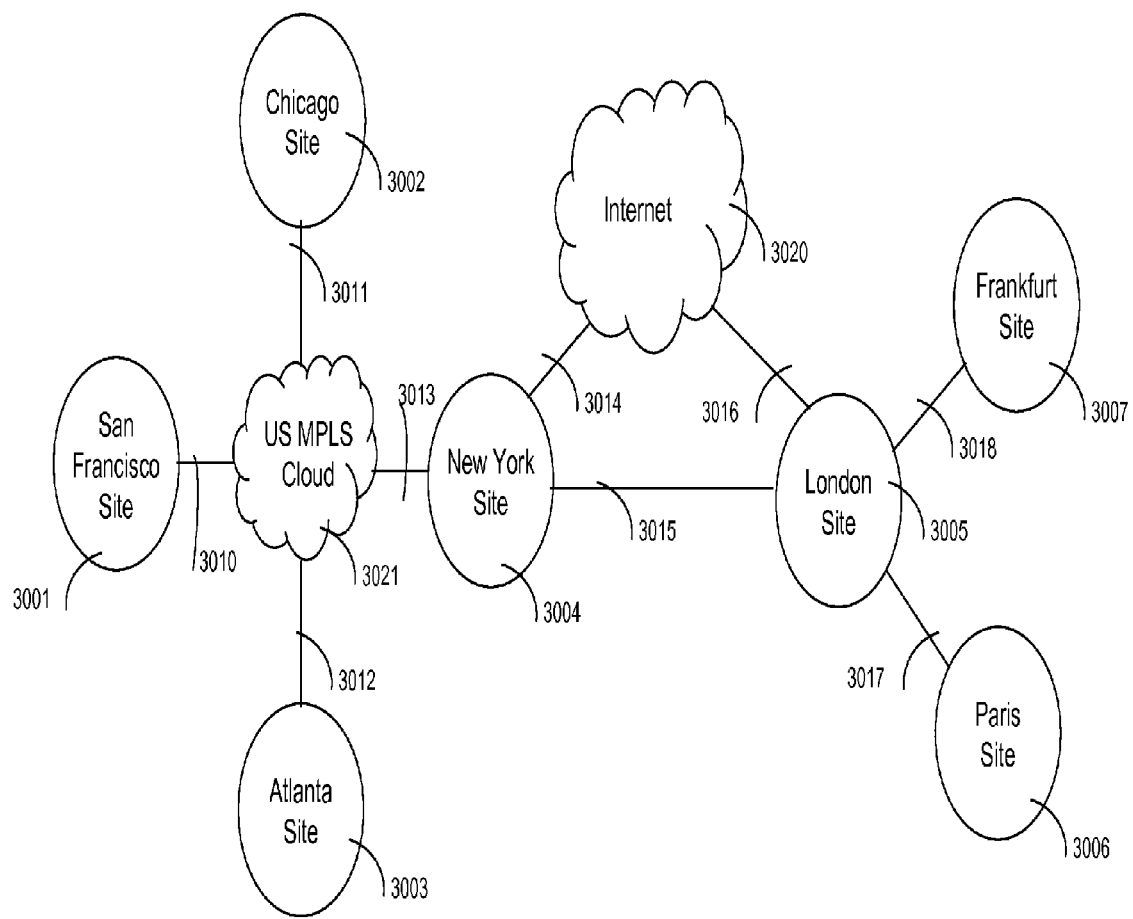
FIG. 30 shows an example network topology model.

Using Sites, Links, and Clouds, arbitrary network topologies can be readily modeled. FIG. 30 shows an example network topology comprising Sites 3001-3007, Clouds 3020-3031, and Links 3010-3018. This network topology models an enterprise network consisting of seven buildings or campuses, interconnected through a variety of network technologies, including an MPLS network in North America and leased lines in Europe. Both the New York Site 3004 and the London Site 3005 connect to the Internet 3020.

Sites can be uniquely defined by a list of IP subnet ranges or a set of IP addresses associated with each Site. This list of IP subnet ranges or IP addresses is used to associate each endpoint involved in real-time communication with a specific Site in the network topology model. Links are defined in terms of the pair of Sites they connect. Links can be bidirectional, unidirectional, or both. Unidirectional Links can be defined by the pair of the source Site and the destination Site involved. This is useful for management of the effects of large one-way traffic flows that occur in streaming audio, streaming video, and web server support. When using unidirectional Links, bidirectional communications facilities can be modeled with two Links oriented in opposite directions.

Unified Bandwidth Manager 110 can use graphical user interfaces 121 to allow administrators to create and edit the network topology model in the Topology Management module 134. Unified Bandwidth Manager 110 can use software interfaces to the underlying network infrastructure (specifically routers and switches) to construct automatically the network topology model. This can be done by interfacing to routers and switches directly or by "sniffing" packets traveling over the network using a network monitor. Unified Bandwidth Manager 110 can also use a hybrid approach where information collected by interfacing to the network infrastructure is used to assist administrators in creating the topology model.

Unified Bandwidth Manager 110 can use the network topology model to calculate the route that real-time communications traffic is likely to take over the underlying network using the modeled topology. A least-cost routing algorithm may be used to find the shortest path as follows: based on the IP address of the source endpoint involved in the communication, the Unified Bandwidth Manager 110 finds the source Site for that communication. Based on the IP address of the destination endpoint involved in the communication, the Unified Bandwidth Manager 110 finds the destination Site for that communication. Then, using a shortest path calculation, the Unified Bandwidth Manager 110 uses the network topology model to calculate the exact path for the communications traffic. This path consists of a collection of Links and Sites traversed by the real-time communications traffic. As an example, a Dykstra algorithm can be used for shortest path calculations, although other approaches familiar with one skilled in the art may be used.

Shortest path calculation can be based on hop count for each path. However, shortest path calculation may also use a cost value associated with each Link, but the cost is not necessarily a financial cost and may reflect a wide range of considerations. Administrators can adjust values of the abstracted network Link costs to ensure a model calculated route matches the actual route taken by IP packets under specified conditions.

The calculated route is used as reference for a number of bandwidth reservation policies and associated strategies for dealing with bandwidth overloading to be discussed later.

Bandwidth Pools

Unified Bandwidth Manager 110 provides for bandwidth reservation and bandwidth management based on a collection of bandwidth pools managed by the Bandwidth Pools module 128. A bandwidth pool defines one or more bandwidth constraints that can be imposed on a wide variety of entities (such as Links, Sites, Clouds, user groups, classes of service, etc.) for use in bandwidth, call, and session allocation processes. These constraints could consist of a total amount of available bandwidth or a maximum number of simultaneous calls or sessions, or some combination thereof. Bandwidth constraints may be further qualified by associating them with specific media types (e.g. specifying maximum video bandwidth separately from maximum audio bandwidth), with specific groups of users (e.g., executives have access to a larger bandwidth pool than support staff), with specific types of devices (e.g., rooms-based video conferencing systems have access to a larger bandwidth pool than desktop video conferencing software).

The Bandwidth Pool module serves as the master representation of bandwidth constraints that is used to drive provisioning and enforcement of bandwidth constraints for each of the communication silos that are managed by the Unified Bandwidth Manager 110.

Bandwidth pools can be based on the network topology model managed by the Topology Management module 134. In such an approach, each Site or Cloud in the network topology model can have one or more bandwidth pools associated with it. Similarly, each Link in the network topology model can have one or more bandwidth pools associated with it.

Figure 31:
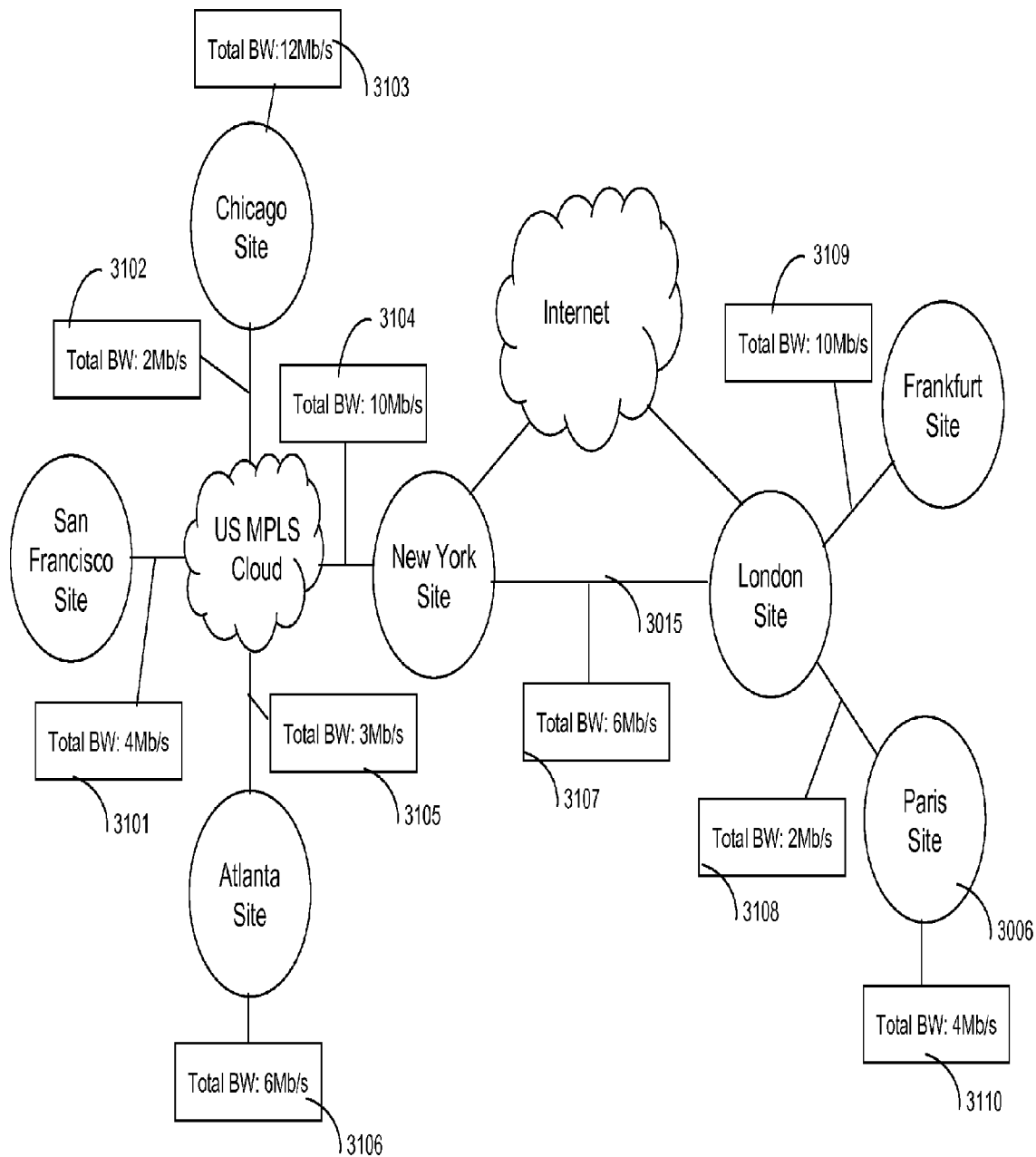
FIG. 31 shows an example of bandwidth pools associated with a network topology model.

FIG. 31 shows an example of Bandwidth Pools associated with elements of a network topology model. In the example, most of the Links have bandwidth pools associated with them, indicating a bandwidth constraint. For example, the link 3015 between New York and London has a bandwidth pool 3107 associated with it that limits bandwidth use over that link to 6 Mb/s. Similarly, Site 3006 representing the Paris location has a bandwidth pool 3110 associated with it that limits bandwidth utilization within that site to 4 Mb/s.

The same bandwidth pool may also be associated with multiple network elements (Sites, Links, or clouds) in the network topology model. This may be useful, for example, when a Site connects to one or more Links or one or more Clouds using the same physical network circuit. For example, a Site may use a VPN connection that is established over the same access circuit that is also used to connect that Site to the Internet. In the network topology model, the VPN connection is modeled as a Link, and the Internet connection is modeled as a connection to a Cloud. However, the same bandwidth pool may be associated with both to reflect the bandwidth constraints of the shared access circuit.

Figure 32:
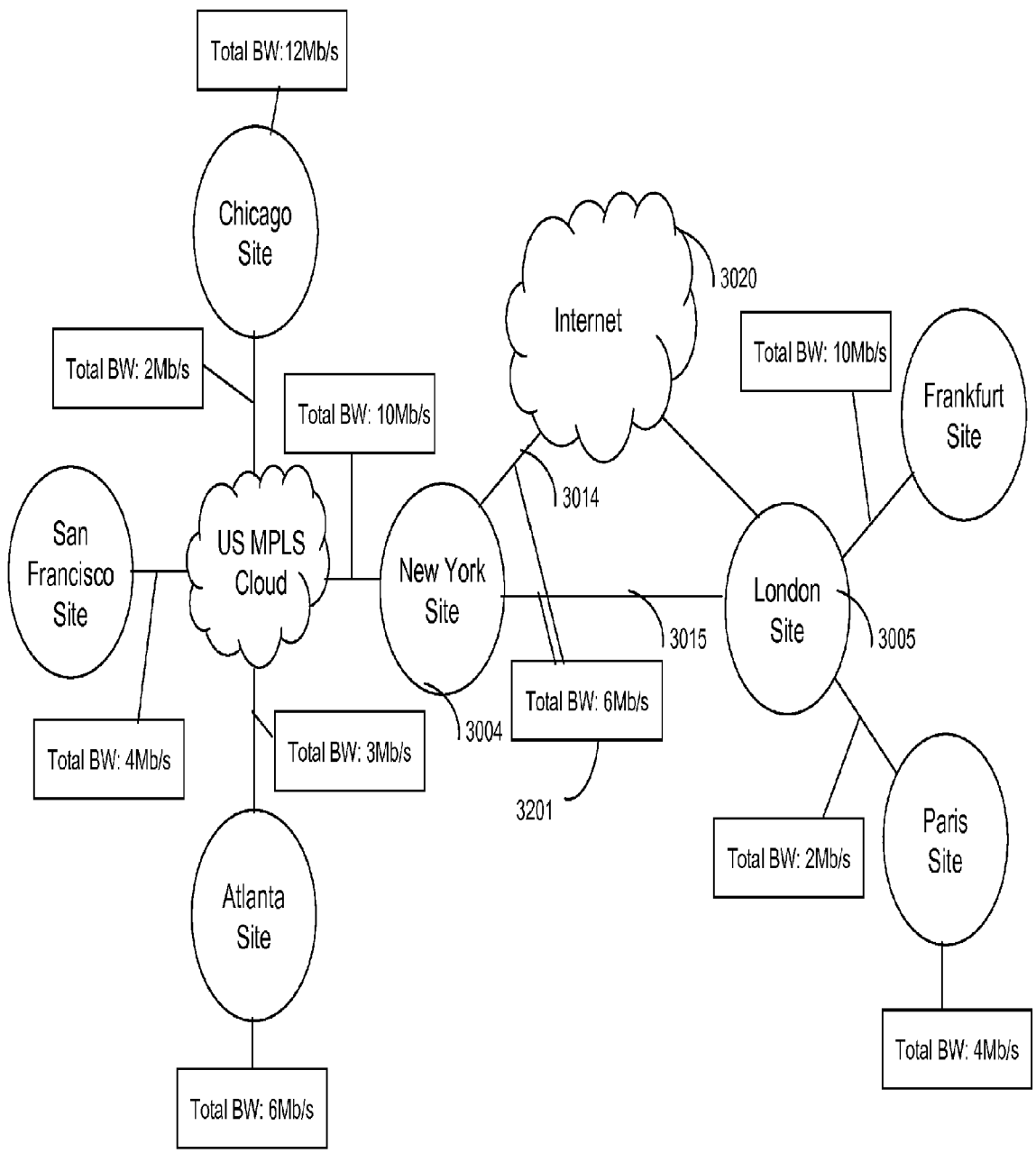
FIG. 32 shows an example of a bandwidth pool that is associated with multiple elements in a network topology model.

FIG. 32 shows an example where Link 3014 between the New York Site 3004 and the Internet cloud 3020 shares bandwidth pool 3201 with Link 3015 between the New York Site 3004 and the London Site 3005.

And finally, bandwidth pools may also be organized hierarchically. Hierarchical organization of bandwidth pools may be useful in providing fine grain control over bandwidth utilization within the constraints of a total amount of available bandwidth. For example, for a given Link, one bandwidth pool might specify that 75% of the available bandwidth can be used for video conferencing traffic. A second bandwidth pool might specify that 50% of available bandwidth can be used for VoIP. A third bandwidth pool might be provisioned to be a "parent" bandwidth pool for those two bandwidth pools; this bandwidth pool might limit the total available bandwidth that can be used for any real-time traffic to 90% of the available capacity on the Link. This type of structure precludes the scenario where 125% of the available bandwidth is reserved by letting each bandwidth pool operate independently.

Figure 33:
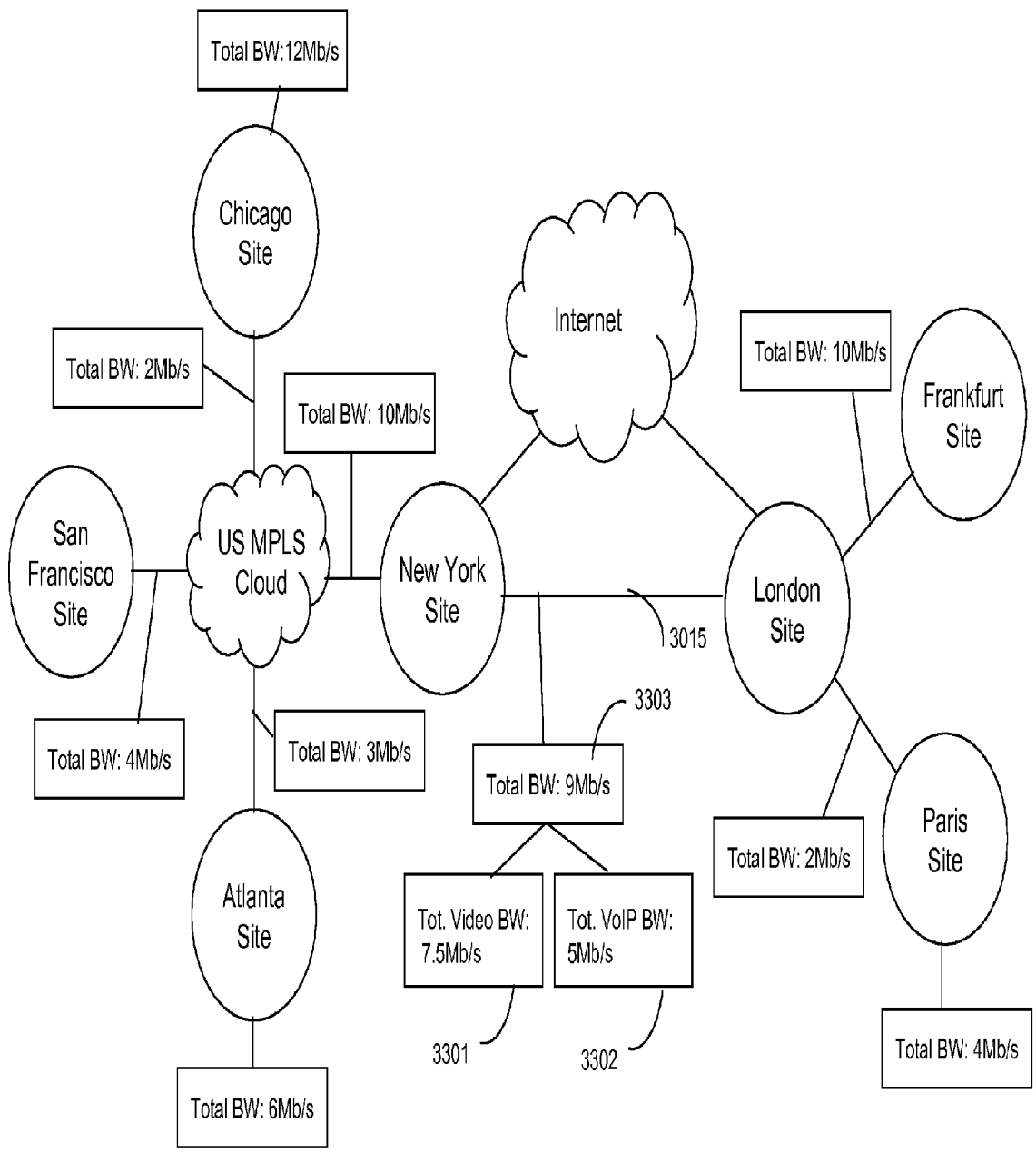
FIG. 33 shows an example of hierarchical bandwidth pools.

FIG. 33 shows an example of hierarchical bandwidth pools where Link 3015 has a bandwidth pool 3301 for video limiting traffic to 7.5 Mb/s, a second bandwidth pool 3302 for VoIP limiting traffic to 5 Mb/s, and a parent bandwidth pool 3303 limiting total aggregate bandwidth to 9 Mb/s.

Unified Bandwidth Manager 110 can use graphical user interfaces 121 to allow administrators to create, define, and edit bandwidth constraints for bandwidth pools, which may for example reside or operate in a Bandwidth Pools module 128 within the Unified Bandwidth Manager 110. Unified Bandwidth Manager 110 can use software interfaces to the underlying network infrastructure (specifically routers, switches, and network monitors) to query physical network constraints such as the capacity of a link, the loading of a switch backplane, provisioned Quality-of-Service (QoS) parameters, and so on. This can be done by interfacing to routers and switches directly or by "sniffing" packets on the network using an external or integrated network monitoring system. In some embodiments, the Unified Bandwidth Manager 110 may employ a hybrid approach wherein information collected by interfacing to the underlying network infrastructure is used to assist administrators in specifying network constraints.

When bandwidth pools are associated with the network topology model, the Unified Bandwidth Manager 110 calculates the path (for example using a shortest path algorithm as discussed earlier) taken by communications streams over the underlying network, where the path consists of the sequence of Sites, Links, and Clouds traversed by those communication media. The Unified Bandwidth Manager 110 then finds the bandwidth pools (if any) associated with all network topology elements (Sites, Clouds, and Links) in the calculated path to enforce the associated bandwidth constraints. Enforcing bandwidth constraints can be accomplished by having the appropriate communications silos 130 present correct session parameters (including allowable bandwidth) to the endpoints involved in the communication. Alternatively, the Unified Bandwidth Manager 110 or individual communications silos 130 may also communicate with routers and switches directly to instruct them to enforce any bandwidth constraints.

Bandwidth Policies

Unified Bandwidth Manager 110 provides for bandwidth reservation and bandwidth management based on a collection of bandwidth policies managed by the Policies module 114. Bandwidth policies are used to police how much bandwidth is allocated and reserved from the bandwidth pools managed by the Bandwidth Pool module 128 for each individual call or session. The Policies module 114 serves as the master representation of bandwidth reservation and allocation policies that is used to drive provisioning and enforcement of bandwidth policies for each of the communication silos 130 that are integrated by the Unified Bandwidth Manager 110.

Bandwidth policies can specify a per-call maximum call bit-rate that specifies the maximum allowed bandwidth that can be allocated for a given call. Bandwidth policies can also include a minimum accepted call bit-rate parameter that specifies the minimum bandwidth that endpoints will accept when trying to allocate bandwidth. If bandwidth allocation decision cannot provide at least the minimum accepted call bit-rate bandwidth, the call request will be rejected.

Different bandwidth policies may apply to different classes of users. For example, VIP users may be authorized by bandwidth policies to place calls at 768 kb/s calls (resulting in a hi-res video conferencing experience). The same policies may specify that standard users are limited to 384 kb/s calls (resulting in a lower-quality video connection). And finally, support staff may be prohibited from using video altogether through bandwidth policies that limit bandwidth such that only audio calls can be supported.

Different bandwidth policies may also apply to different classes of endpoints. For example, conference room video systems might be allowed to place calls at 1 Mb/s (resulting in HD video), whereas desktop systems may max out at 512 kb/s. Minimum accepted call bit-rate constraints can also be imposed. For example, desktop users may have their minimum accepted call bit-rate configured to 64 kb/s, indicating that they must be willing to accept audio-only calls when insufficient bandwidth is available to maintain a video call. Conference rooms, on the other hand, might specify a minimum accepted call bit-rate to 384 kb/s, indicating that they would not accept anything less than a "standard" video conferencing experience.

Different bandwidth policies may also be associated with different elements (Sites, Clouds, and Links) in the network topology model. For example, a policy on trans-Atlantic Links may allow VIP users' video to be maintained at 512 kb/s while standard users get throttled down to 256 kb/s. In the same system, a different policy may be used on Links with Asia, for example wherein video is only allowed for VIP users while other users are only permitted to place audio-only VoIP calls.

Each of the bandwidth policies may also take time of day into account: for example, at 9:00 am in the morning when the bulk of staff first arrive for the workday at a particular office, bandwidth constraints may temporarily make more bandwidth available for voice and video calling than during slower hours in the afternoon.

Bandwidth policies may also provide the ability to allow bandwidth to be reserved ahead of time to support scheduled events so the event can go off without a glitch.

Proxy Interface and Surrogate Call Admission Control

Proxy interface 126 interacts with SIP, H.323, and other call and session control protocols for control, monitoring, and management of SIP, H.323, or other related session admission communication silos. In addition to controlling external communications silos, in some embodiments the proxy interface may also be used to allow the Unified Bandwidth Manager 110 to itself provide the functions of a SIP Proxy Server, SIP Back-to-Back User Agent (B2BUA), or an H.323 Gatekeeper. The latter allows Unified Bandwidth Manager 110 itself to act as one or more communications silos and provide bandwidth management directly, rather than through controlling an external silo. Therefore, in some embodiments, the Unified Bandwidth Manager 110 may optionally include Surrogate Call Admission Control 122 modules, each of which serves as a standalone communication silo for SIP, H.323, or other bandwidth management oriented protocol.

Security and Audit

The Unified Bandwidth Manager 110 may include a Security and Audit module 124 to control which users are allowed to access the system and what type of privileges they have. In addition, the Security and Audit module 124 can be used to provide an integrated audit log for all administrative system activity within the scope of the Unified Bandwidth Manager 110.

Performance Management

Performance management functions 131 capture detailed information about all system activity, including but not limited to call activity, session establishment, bandwidth reservation requests, busy signals, allocation failures, and so on. This module can provide a single roll-up view of aggregated activity and performance of individual communications silos 130 including parties in the call, bandwidth used, routing, packets sent, packets lost, jitter, latency, and so on. Performance management functions 131 also generate reports on captured call/session information as well as aggregated performance statistics across and within various plurality of communication silos 130*a*-130*n*. Performance management functions 131 may drill down into this and other captured information for use in diagnostics.

Further detail will be provided in the disclosure to follow, but in providing these and other related functions, Unified Bandwidth Manager 110 may also comprise one or more of the following elements: Controllers 112, Empirical models 116, and Interpreters 118.

Bandwidth Control via Call/Session Admission and Other Techniques

The Unified Bandwidth Manager 110 provides a number of high-level bandwidth allocation functions, these including: [0091] call admission control for applications and bandwidth reservation system employing a call paradigm (VoIP, video conferencing, etc.), [0092] analogous session admission control for other load-intensive applications and bandwidth reservation system employing a session paradigm (streaming video, streaming audio), [0093] other types of bandwidth utilization control. Attention is now directed to further aspects of admission control and then to non-admission methods of bandwidth usage control.

In some embodiments, various manufacturer bandwidth reservation system products are interacted with on their own terms and the adopted features are imposed on the resulting overall system comprising a plurality of such manufacturer bandwidth reservation system products and the Unified Bandwidth Manager 110. For example, depending on the capabilities of the individual communications silos, it may be possible for individual communications silos 130 to make call admission decisions locally, without involving the Unified Bandwidth Manager 110 at session-initiation time. This may be possible by using the network topology model, bandwidth pools, and bandwidth policies in the Unified Bandwidth Manager 110 to provision delegated bandwidth management and reservation capabilities within the individual communications silo. For example, a communications silo 130 may maintain its own (possibly simplified) network topology model or provide bandwidth policies based on class-of-user. In this case, the Unified Bandwidth Manager 110 can delegate bandwidth reservation functionality to the individual communications silo. In such embodiments, the Unified Bandwidth Manager 110 is responsible for continuously updating the bandwidth reservation parameters used by bandwidth management functionality (e.g. total available bandwidth) in the silo, such updates in response to communications happening in other communications silos. In addition, the Unified Bandwidth Manager 110 can inform other communications silos 130 of any communications managed locally by that silo.

In other embodiments, the Unified Bandwidth Manager 110 becomes aware of an endpoint's request of an individual communications silo 130 to setup communications and applies bandwidth policies to this request to decide how much bandwidth is required for this communications (and optionally in which Sites and over which Links). The Unified Bandwidth Manager 110 then checks the status of the relevant bandwidth pools to decide if the requested bandwidth is available (taking other simultaneous communications activity into account). If the bandwidth is available, the Unified Bandwidth Manager 110 allows the communications to take place, and informs the other communications silos 130 of the newly initiated communications. This can be accomplished using a variety of methods and mechanisms as will be described later. Well-known techniques such as clustering, replication, and distribution may need to be used to make sure these operations can be performed with acceptable performance.

In some embodiments, a hybrid of the two approaches is possible: an individual communications silo 130 takes care of bandwidth management and bandwidth reservation locally, but in addition the Unified Bandwidth Manager 110 augments the individual stand alone capabilities of a particular communications silo 130 with more additional capabilities based on a more complete topology model, more fine-grain bandwidth pools, more sophisticated policies, or some combination thereof.

Strategies for Dealing with Bandwidth Overloading

In overload conditions, the Unified Bandwidth Manager 110 can take on roles helpful in addressing network bandwidth shortage. As a first example, the Unified Bandwidth Manager 110 may support a number of strategies for dealing with bandwidth shortages at call setup time. Typically the Unified Bandwidth Manager 110 and the communications silos 130 leverage simple call admission control: if there deemed to be insufficient bandwidth for the call, the call is rejected. As a first extension to pure call admission control, the Unified Bandwidth Manager 110 may allow the call to go through, but using bandwidth that is reduced from what was originally requested. Depending on the sophistication of the bandwidth policies, the Unified Bandwidth Manager 110 may decide to reduce requested bandwidth as long as it exceeds the "minimum accepted call bit-rate" specified in the appropriate bandwidth policies, and reject the call if that minimum cannot be satisfied.

The Unified Bandwidth Manager 110 may implement call admission control using a variety of mechanisms: by communicating with individual communication silos 130 if possible, by communicating with network infrastructure such as routers and switches, or by communicating with the endpoints in the communications.

In addition to call admission control, some embodiments of the Unified Bandwidth Manager 110 may provide more sophisticated strategies for dealing with bandwidth shortage. For example, the Unified Bandwidth Manager 110 could cause individual communications silos 130 to dynamically change the bandwidth used by individual calls managed by that silo 130 while the call is active. For example, to avoid generating a busy signal when new call comes in, the Unified Bandwidth Manager 110 might decide to throttle down all other calls across a network Link to free up bandwidth for the new call. The Unified Bandwidth Manager 110 might decide to take bandwidth policies into account when throttling down call bandwidth. For example, it should be possible to throttle call bandwidth all the way down to the minimum accepted call bit-rate specified in the bandwidth policies for each call. Note that this might result in a video call turning into an audio-only call if call bit-rate policies allow it.

Conversely, if bandwidth becomes available when calls are terminated, the Unified Bandwidth Manager 110 might decide to make newly freed up bandwidth available to calls that don't run at their requested call bit-rate.

Other embodiments may implement even more sophisticated strategies by introducing the notion of a priority associated with various classes of users. This could mean that when a call comes in from a user with a higher priority, the Unified Bandwidth Manager 110 might have to terminate lower-priority calls to make bandwidth available for the higher priority user. In some embodiments, the Unified Bandwidth Manager 110 frees up bandwidth for high-priority calls only by terminating calls managed by the same communications silo. In other embodiments, the Unified Bandwidth Manager 110 may terminate a call on one communications silo 130 to make bandwidth available for a new call on a different communications silo.

And finally, when insufficient bandwidth is available to route the call directly using the shortest route, the Unified Bandwidth Manager 110 could use its topology model to consider alternative communication paths. For example, it could instruct individual communications silos 130 to use ISDN for overflow call routing or to use an alternative IP path. Note that this requires relay servers such as the ones commonly used in Content Delivery Networks.

All of these strategies can be implemented using the various techniques mentioned above for communication between the Unified Bandwidth Manager 110 and the individual communications silos: the Unified Bandwidth Manager 110 may delegate to individual communication silos, the Unified Bandwidth Manager 110 may provide these strategies on behalf of individual communications silos, or the Unified Bandwidth Manager 110 may use a combination of both.

Using these bandwidth control and admission capabilities, the Unified Bandwidth Manager 110 is in a position to support a wide range of differentiated features that will be described next.

Topologically-Aware Call Admission Control

Unified Bandwidth Manager 110 can provide for topologically aware admission control. Topologically-aware call admission control can be implemented for embodiments that provision bandwidth policies for bandwidth pools that are associated with Sites, Clouds, and Links. The Unified Bandwidth Manager 110 calculates the route between source and destination for each call or session managed by the individual communications silos. For each network element (Site, Cloud or Link) along the route, the Unified Bandwidth Manager 110 attempts to allocated bandwidth from the associated bandwidth pools as per the provisioned policies. If no bandwidth is available, the call request is rejected. The system can in this fashion limits specific types of service traffic (for example, video) within a location and among locations. If bandwidth limits are reached, calls are rejected and a busy signal is generated.

Figure 23:
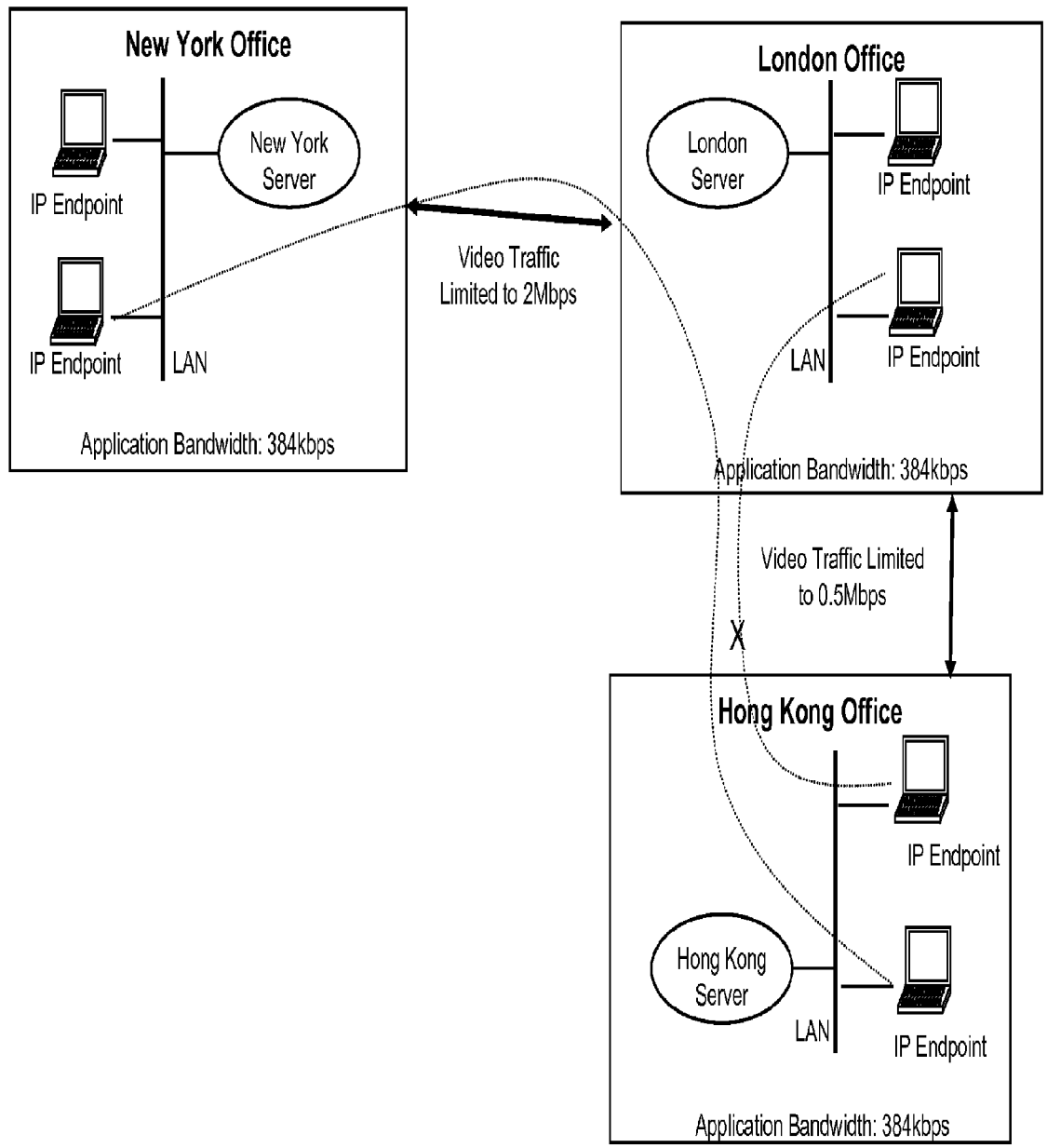
FIG. 23 depicts a call admission control example.

FIG. 23 depicts a call admission control example 2300. A first video call from New York office to Hong Kong office prevents the admission of a second request for a call from London office to Hong Kong office because of insufficient bandwidth on the London/Hong Kong communications Link. However, there is clearly enough bandwidth for additional calls between London and New York. Just counting calls across the entire network and setting an upper bound on the total enterprise-wide count would then either result in poor performance for the two Hong Kong calls or prevent additional calls between New York and London for which there is indeed adequate bandwidth.

Support for Mobility: Automatic Server Referral

In some embodiments, the Unified Bandwidth Manager 110 may be implemented in a distributed fashion for purposes of system resiliency and performance. In such embodiments, the Unified Bandwidth Manager 110 might delegate management of specific sub-sets of the overall network topology to different servers. For example, one server may be responsible for all North America Sites, a second server for all European Sites, and a third server for all Sites in Asia. As explained below, the Unified Bandwidth Manager 110 can ensure mobile endpoints register with the appropriate server for their location.

When endpoints attempt to register with a server in a communications silo, the server or the Unified Bandwidth Manager 110 will verify that the endpoint IP address is in a configured range for one of the Sites managed by that server. If this is so, that registration attempt will succeed and the endpoint is associated with its Site. If the endpoint address is not in the set of IP ranges for any of the Sites on that server, the Unified Bandwidth Manager 110 will lookup the server that contains the Site for the specified IP address and refer the endpoint to it. Eventually referral and indirect registration occur transparently from the viewpoint of the end user.

Figure 24:
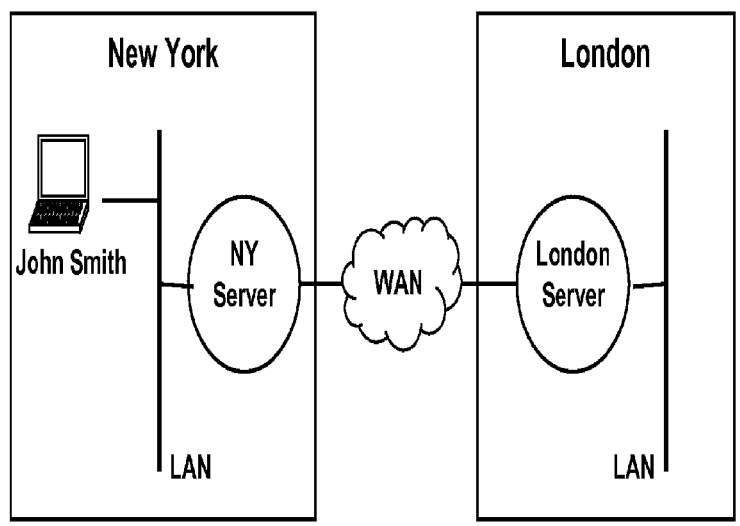
FIG. 24 illustrates an example of automatic server referral.
Figure 24:
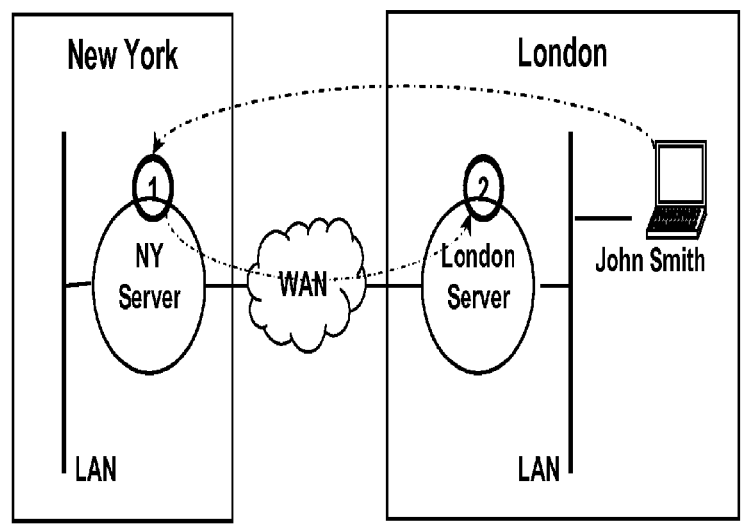

FIG. 24 illustrates an example 2400 of automatic server referral. In the example, a user regularly travels between New York and London. In the example, there is a single communications silo server in the New York Office. On a particular day, the user logs in from the New York Office and registers with that New York silo server. The next day, the user attempts to log in from the London Office. In this case, the passive network environment will attempt to register that user at the silo server in New York. However, depending on the capabilities of the communications silo, the Unified Bandwidth Manager 110 can instruct that silo (using mechanisms described later) to refer user to the London silo server for registration and registration occurs there in London.

Bandwidth Utilization Control

In some embodiments, the Unified Bandwidth Manager 110 implements bandwidth utilization control so as to additionally leverage information in a network topology model yet further. Administrators may associate maximum per-call bandwidth constraints with each network element for example the maximum per-call bandwidth within each Site and the maximum per-call bandwidth for each Link between Sites. This allows administrators to selectively limit bandwidth on "expensive" Links without compromising application quality on bandwidth-rich links. The resulting call or session setup process reduces requested bandwidth if necessary to fit within the limits for each network element. Bandwidth is determined end-to-end to fit within lowest common denominator from the viewpoint of the end-user application. Subsequently, the subsequently determined bandwidth—not the requested bandwidth—is allocated from appropriate bandwidth pools.

Figure 25:
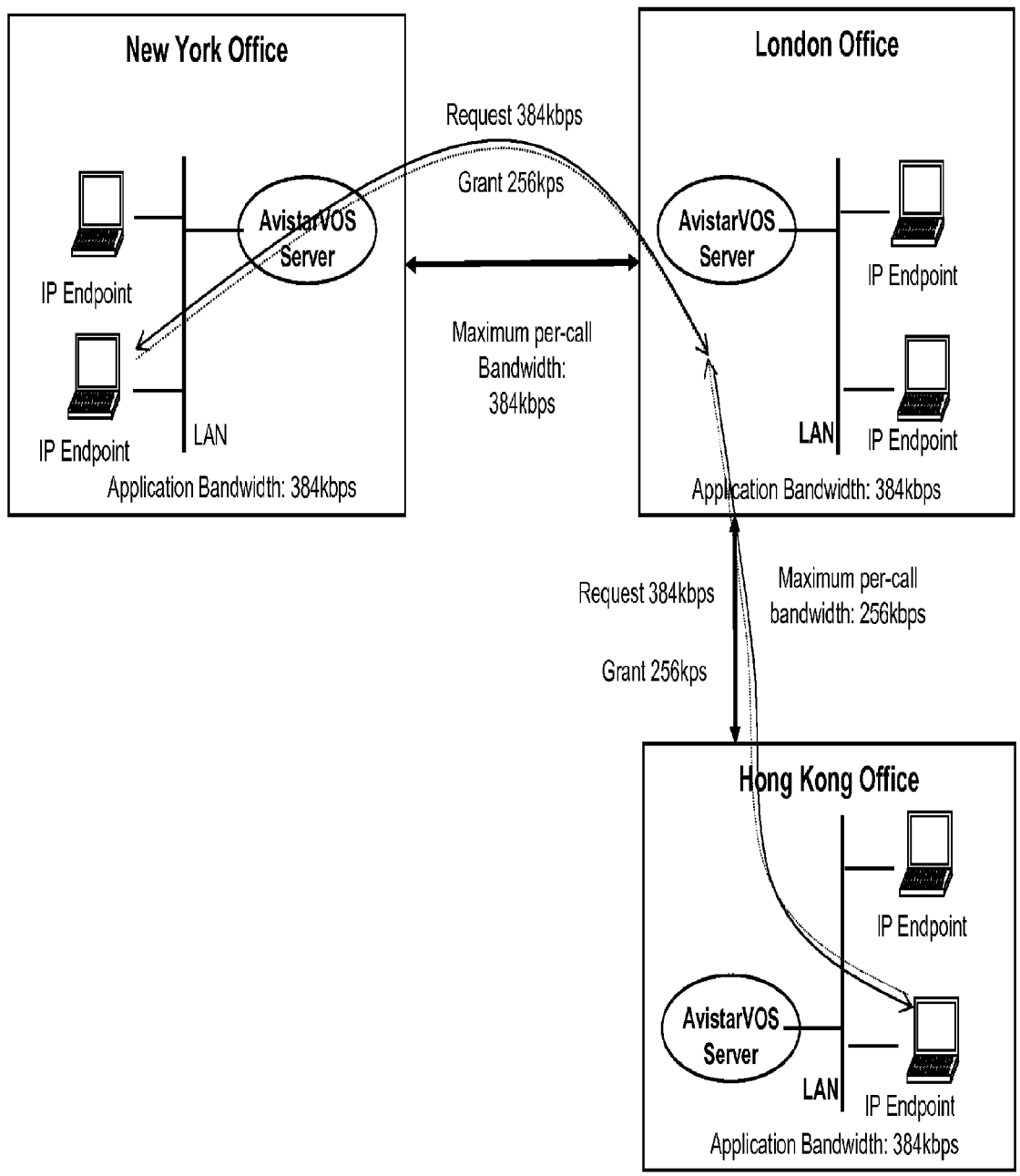
FIG. 25 illustrates an example of how the Unified Bandwidth Manager call setup process reduces requested bandwidth as necessary to fit within the limits for each network element.

FIG. 25 illustrates an example 2500 of how the Unified Bandwidth Manager 110 call setup process reduces requested bandwidth as necessary to fit within the limits for each network element. The resulting function enables administrators to more appropriately manage bandwidth utilization across the enterprise. The Unified Bandwidth Manager 110 selectively limits bandwidth for a particular service (such as VoIP or video). It can provide this value within a location and/or between locations, and multiple topologies are readily supported.

Additionally Unified Bandwidth Manager 110 is architecturally in the position to provide a number of supplemental bandwidth allocation functions. These may include overflow call routing, location-aware resource allocation, location-aware routing, and dynamic automatic bandwidth detection for DSL and wireless links. In addition, the Unified Bandwidth Manager 110 may provide features for failure handling, failure-aware resource allocation, failure-aware routing, failure recovery, and post-failure allocation.

Many of these high-level and supplemental bandwidth allocation functions can be adapted from homogeneous bandwidth reservation systems, classical flow control system, stochastic resource allocation theory, and classical control theory. However, the adaptations are not straightforward and hardly the simple collocation of a bag of known parts and techniques.

Automatic Bandwidth Detection

Automatic bandwidth detection assures calls are placed at a bit-rate that helps maximize call quality, even over wireless networks, while eliminating the allocation of unnecessary bandwidth. Dynamic bandwidth tests are performed on the variable-speed links such as DSL circuits or cable modem links when first presented after a successful login registration. Dynamic bandwidth tests can be performed using standard packet-pair techniques or through other techniques well-known to those skilled in the art. These dynamic bandwidth tests provide information to augment information regarding know static bandwidth configurations so to ensure optimal end-user experience in variable situations such as unknown DSL and wireless links. In this approach, network administrator users of the Unified Bandwidth Manager 110 specify a "default" call bit-rate for all calls on a per-location basis based, for example, on bandwidth policies, user profiles, and so on. This default call bit-rate can be reduced by the Unified Bandwidth Manager 110 to a "measured" rate when measured rate is lower than default rate This capability can reduce packet loss when "requested" call bit-rate is higher than what network access can support.

Additionally, the Unified Bandwidth Manager 110 can provide or utilize end-to-end connectivity testing before a call is placed detects network blockages that would prevent call completion or reduce call quality.

Overflow Call Routing

In some embodiments, the Unified Bandwidth Manager 110 can insure a higher percentage of completed calls by routing calls over alternate paths. For example, the Unified Bandwidth Manager 110 may be configured to route video calls over end-to-end IP paths first. If there are problematic bandwidth constraints along the necessary IP paths, the Unified Bandwidth Manager 110 may then attempt to route the video call over alternate paths such as the PSTN (using H.320 protocol over ISDN) or forces alternate IP path using media relay servers that are inserted in the media communications (stream) path. The Unified Bandwidth Manager 110 thus provides and navigates multiple call routes. The Unified Bandwidth Manager 110 can additionally limit IP video traffic within a given location and between locations. When designated bandwidth limits are reached, calls automatically rollover to other networks.

Figure 26A:
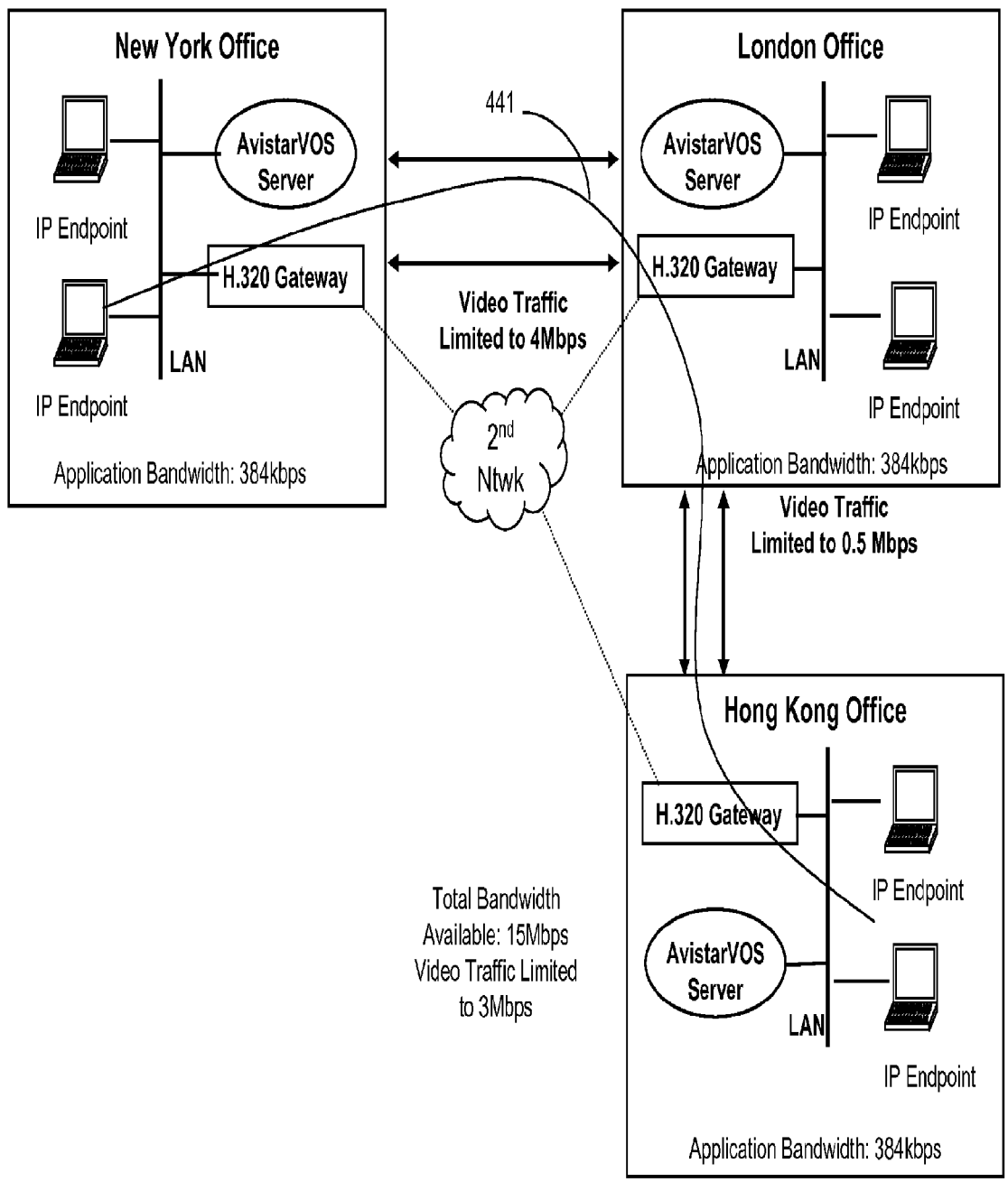
FIGS. 26a-26c depict an overflow call routing example.
Figure 26B:
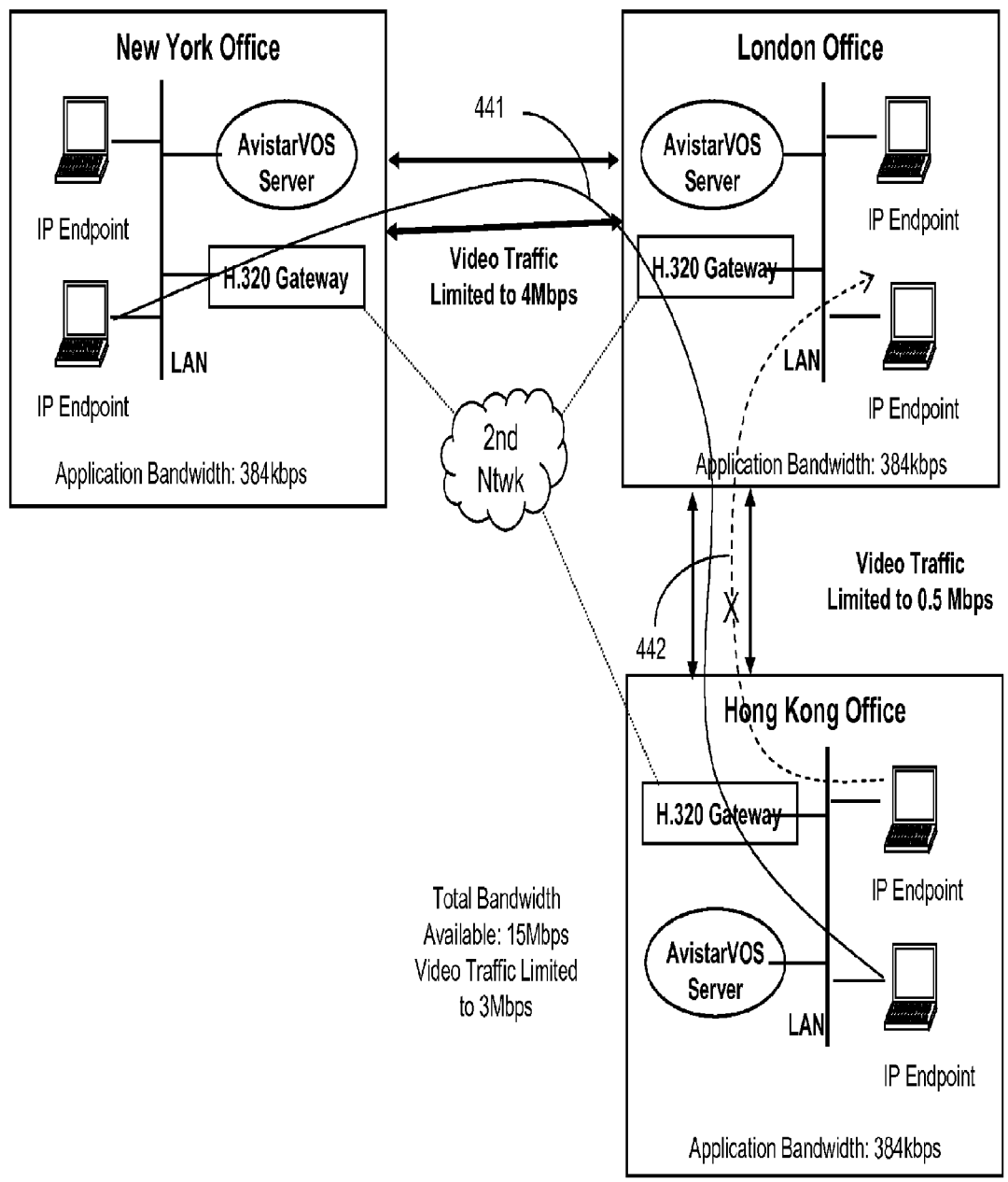
Figure 26C:
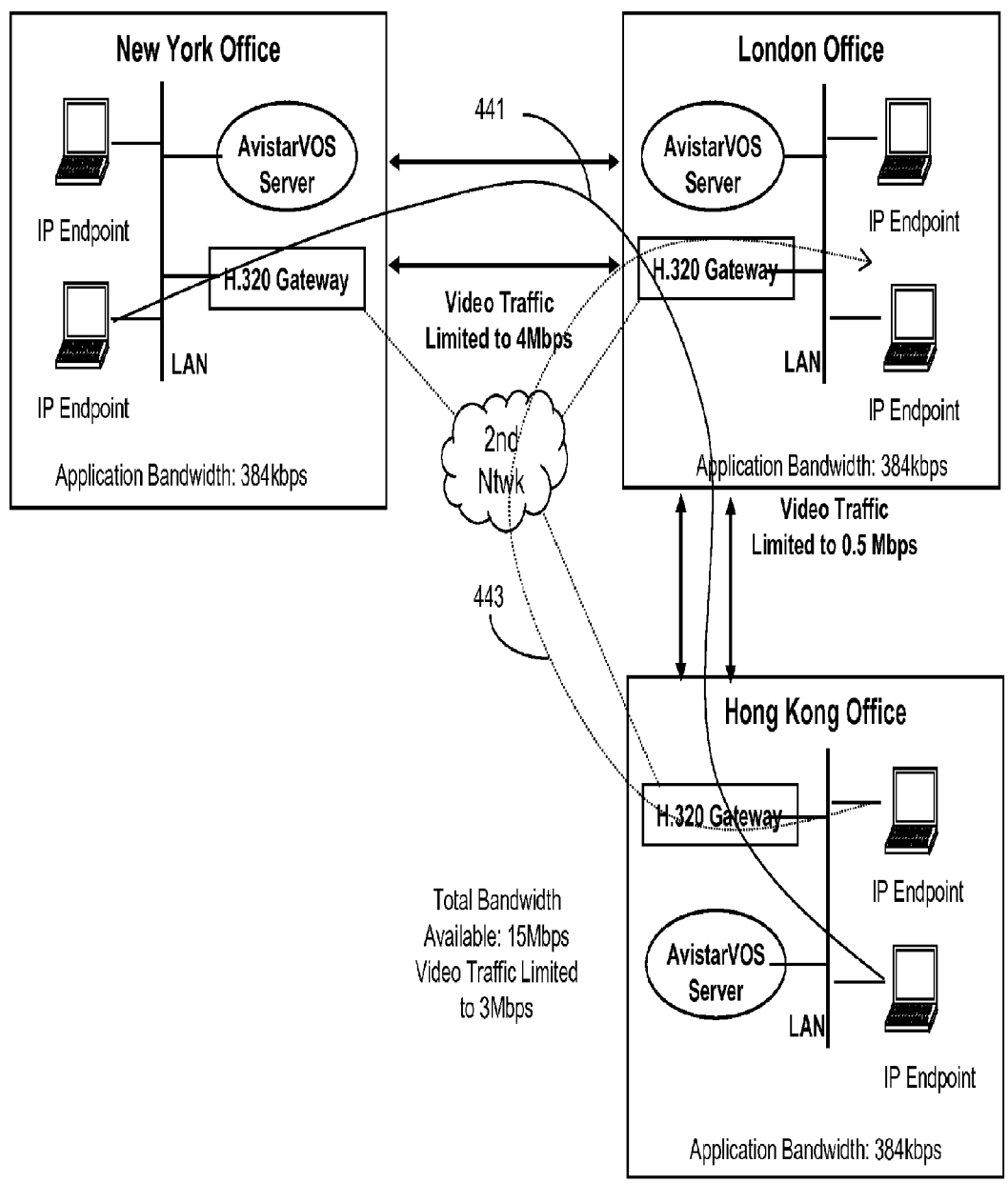

FIGS. 26a-26c depict an overflow call routing example 2600. In FIG. 26a, first a call or session 441 between New York and Hong Kong is successfully routed through a principle IP network and is in active mode. This call or session utilizes bandwidth on Links between London and Hong Kong as shown in the Figure. Next, FIG. 26b shows a routing attempt 442 for a second call which fails because the route is attempting to use unavailable bandwidth on a limited Link between London and Hong Kong. The Unified Bandwidth Manager 110 then instead provides an alternate route 443, as depicted in FIG. 26c, wherein the second call that works because it is using another route.

Location-Aware Resource Allocation

Network architecture, similar to a data network, distributes functionality on the network. Infrastructure services are organized into resource pools. Inherently distributed and redundant resource selection algorithms are motivated by quality and reliability.

In some embodiments, location-aware special server allocation (for example, content streaming servers, conference bridges for multi-party calls, etc.) locates the server as close to the set of participants as viable. For example, an audio or video call between one person in New York and two people in London would optimally be allocated a conference bridge server in London, even if the call was originated in New York. This capability minimizes latency for an optimal number of conference participants and minimizes the total amount of high-load traffic on the network.

Failure Handling Recovery and Post-Failure Allocation

The Unified Bandwidth Manager 110 can monitor network and server resources, detects or acts on notification of failure conditions, and takes failed network and server resources out of service to avoid failed user experiences. After repair, or in the case of an intermittent failure, assignment priorities can be automatically structured around highest-reliability policies.

Optimizing Bandwidth Across Communications Silos

Attention is now directed to how the Unified Bandwidth Manager 110 optimizes the use of bandwidth across a plurality of communications silos 130 by managing an aggregated view of the total available bandwidth on the underlying network infrastructure.

To begin, distinction will be made for each type of application or group of applications that in some sense employs bandwidth regulation; for the purpose of this disclosure each will be called a "service." In general, a particular type of application, such as streaming video, may be represented by a number of vendor products and as a result there may be several bandwidth reservation systems spanning that particular type of application. Also, a bandwidth reservation system product may in some cases in fact span several of its manufacturer's applications. Either of these partitions ('type of application' or 'manufacturer bandwidth reservation system') can be viewed as a service. In many cases these alternate definitions will precisely overlap. It is also possible to create more complex constructions to handle both types of partitions simultaneously. For the sake of simplicity, the illustrative discussions immediately to follow will uniquely associate a "service" with a particular bandwidth reservation system. These abstract representations could also apply to other altered or expanded definitions of "service."

Referring to FIG. 1, let it be taken that at least a plurality of the five illustrated communications silos 130a-130n comprises an associated bandwidth reservation system whose actions pertain to only to one communications service. Those, if any, of the communications silos 130a-130n not comprising bandwidth reservation systems will be considered later (for example, some may be provided a surrogate bandwidth reservation system implemented within Unified Bandwidth Manager 110). In contemporary product offerings and known proposed systems, each such bandwidth reservation system carves out a dedicated portion of the overall network bandwidth available in the enterprise for exclusive use by one or more applications. That is, by definition adopted above, each bandwidth reservation system is provided with a dedicated pool of enterprise network bandwidth for the exclusive use of a service associated with that particular bandwidth reservation system.

In applications where session admission control is used, rather than call admission, the internal details and sharing effects may differ but for the sake of illustration session admission systems can also be viewed in this model as communications silos 130a-130n comprising a bandwidth reservation system.

Figure 2:
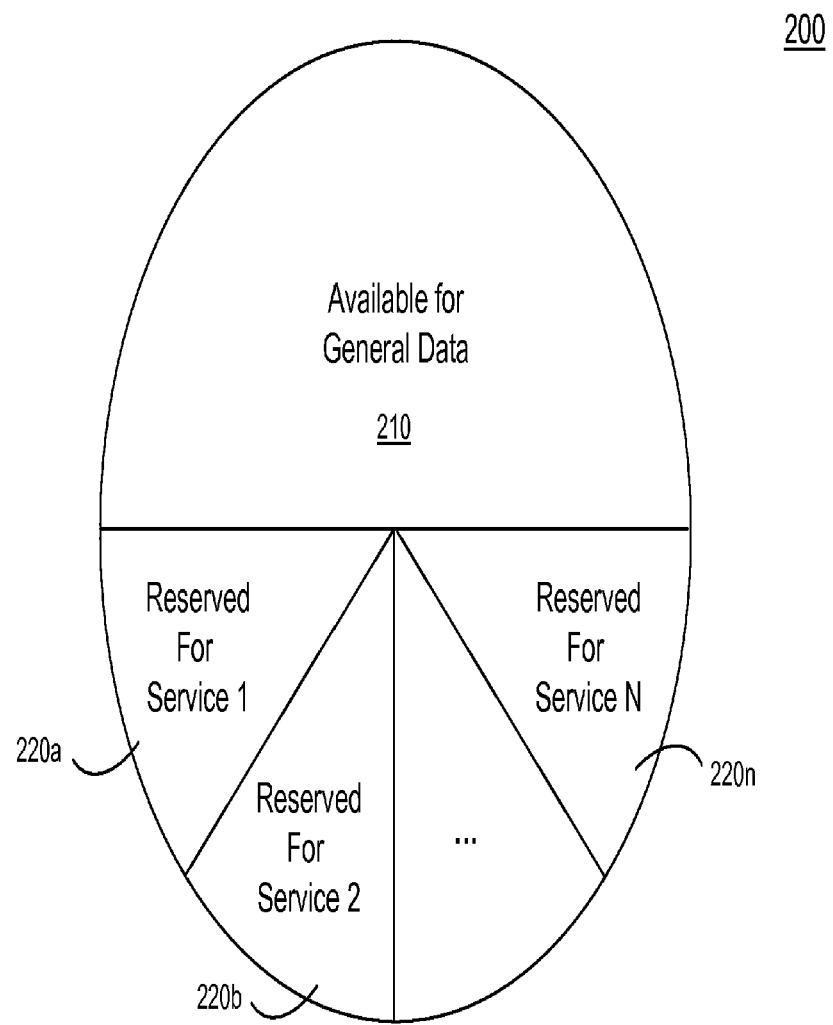
FIG. 2 is a pie chart view of how enterprise network bandwidth is carved up among N services and a segregated general purpose bandwidth pool.

FIG. 2 shows a "pie chart" 200 view of how enterprise network bandwidth is carved up among some number of these services, the number here represented as the variable "N." Each slice 220 of the pie 200 associated with these services (Service 1, Service 2, . . . Service N) represents a portion of bandwidth reserved for the labeled service, i.e., reserved for the exclusive use of each associated bandwidth reservation system to allocate to calls or sessions. The remaining enterprise network bandwidth 210 remains available for general purpose use, outside the scope and reach of the communications silos 130a-130n and their associated services and its bandwidth is not used by these N services.

Figure 3:
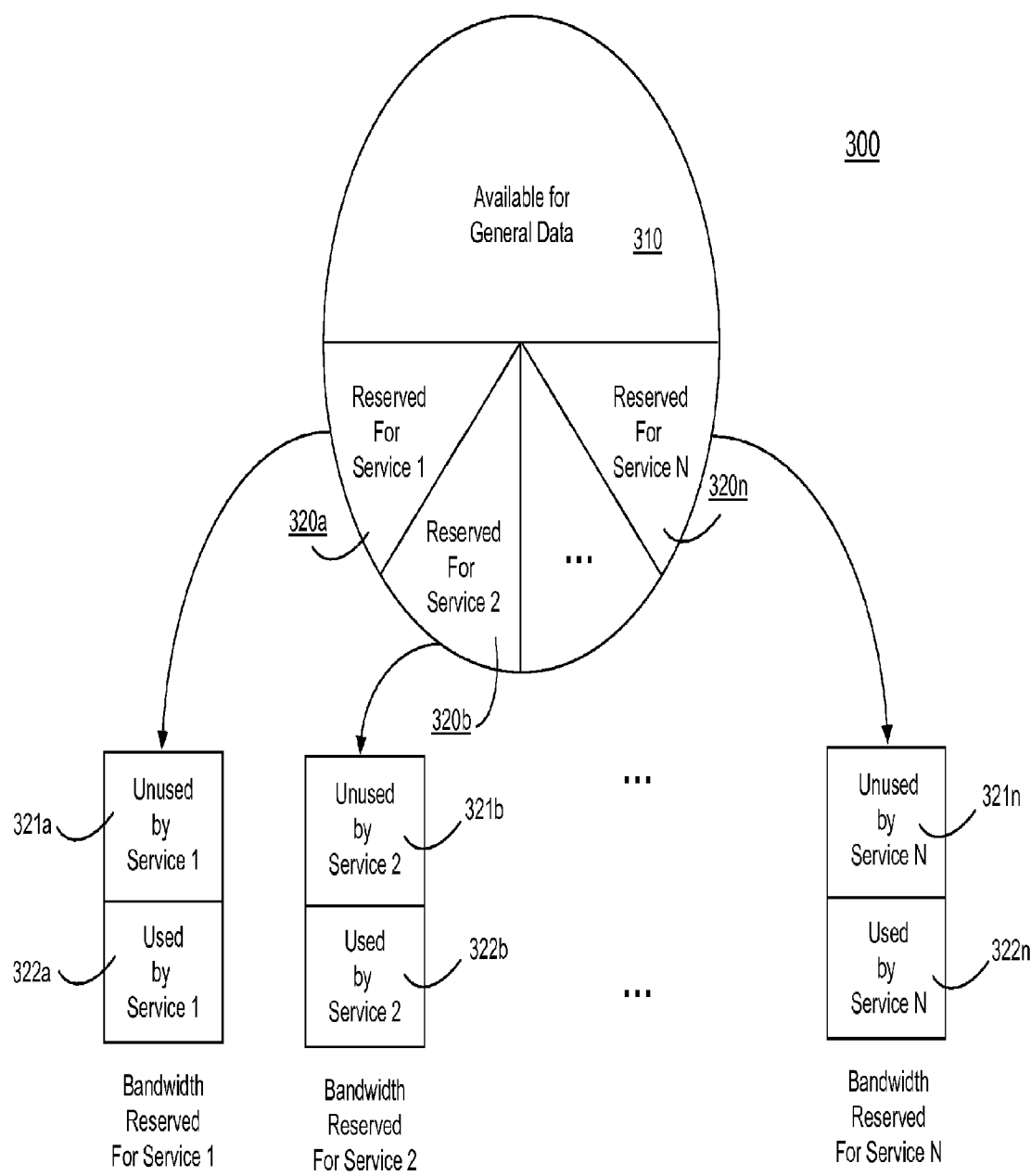
FIG. 3 shows a "pie chart" view of how, at any particular moment in time, each of the bandwidth slices internally comprises both used bandwidth and unused bandwidth.

FIG. 3 shows a "pie chart" view 300 of how, at any particular moment in time, each of the bandwidth slices 320 internally comprises both used bandwidth 322 and unused bandwidth 321. As any of this unused bandwidth 321 is not made available for other services, it can be effectively wasted. Should the demand for a particular service exceed the total amount carved out for that service, any further requests for that service must be denied. This is the case even if there is unused bandwidth 321 in the isolated bandwidth pools of other communications silos 130a-130n.

Figure 4:
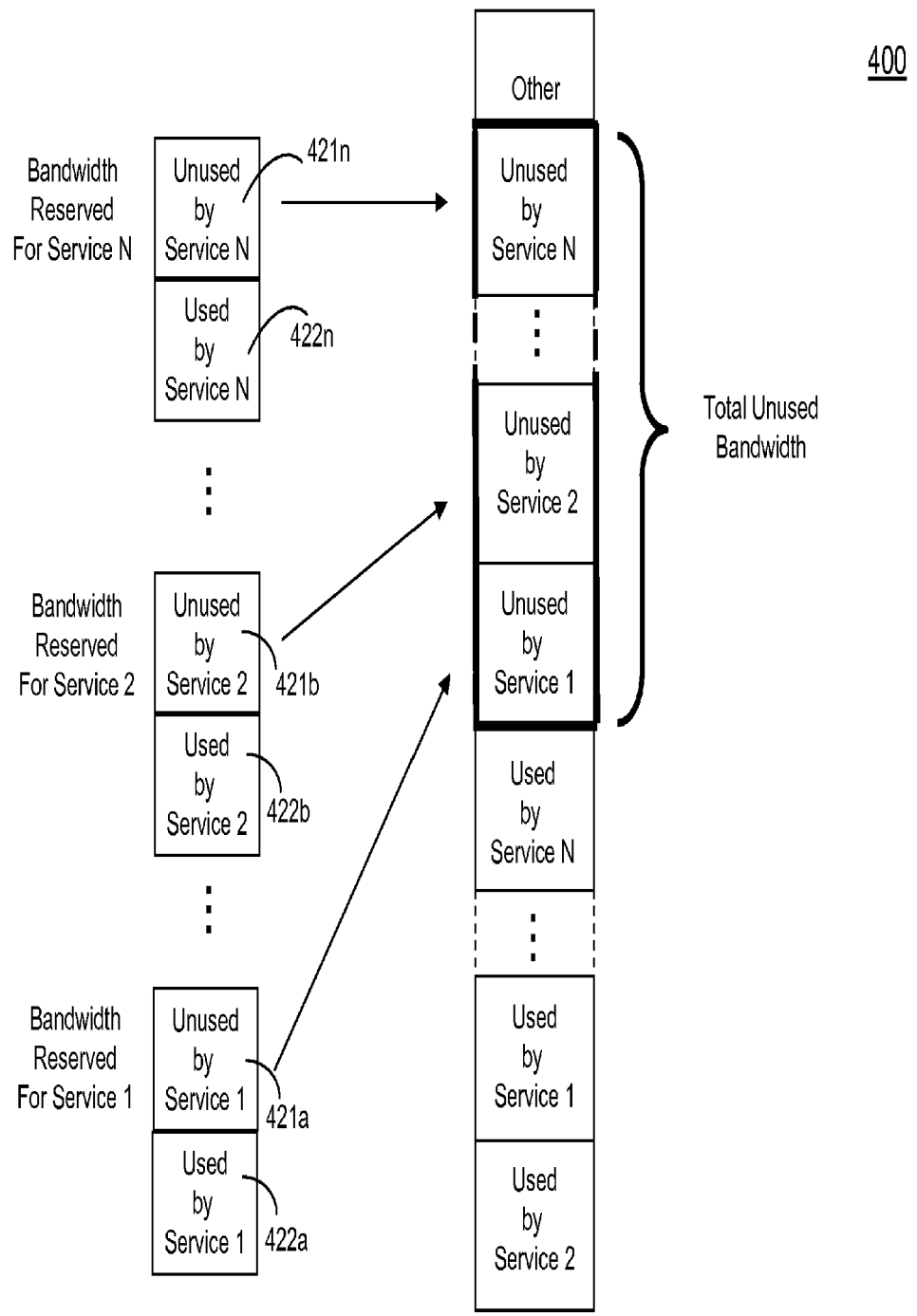
FIG. 4 shows a macro-scale view showing all unused bandwidth being aggregated contiguously.

FIG. 4 shows a macro-scale view 400 showing all unused bandwidth 421 being contiguously aggregated. If there are a large number of services, or inappropriate sizes in the carve-outs for each service, there can be tremendous wastes of bandwidth. On the other hand, if the carve-outs for each particular service are not large enough, that service could suffer a high frequency of request rejections and denial of service.

Figure 5:
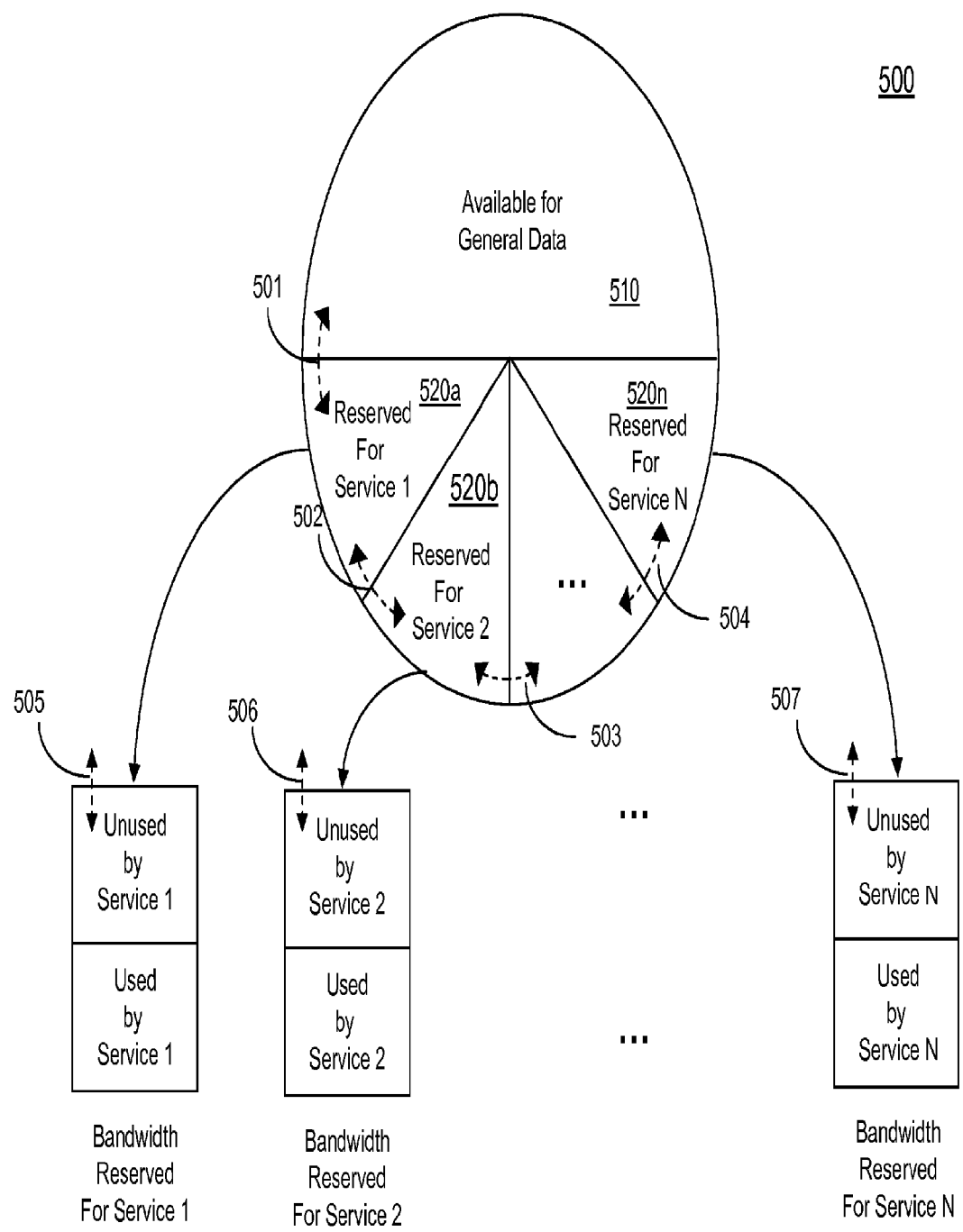
FIG. 5 shows a "pie chart" view of how bandwidth allocation can be adjusted.

FIG. 5 shows a "pie chart" view 500 of how bandwidth allocation can be adjusted. Unified Bandwidth Manager 110 can dynamically adjust the size of the bandwidth allocations made to each of the bandwidth reservation systems, as suggested by the dashed arrowed lines 501-507 in FIG. 5. In FIG. 5, the bandwidth reservation systems are represented as individual regulators, each regulating the admission policies for an associated service.

The aforementioned bandwidth allocation adjustments, made to these admission regulators by Unified Bandwidth Manager 110, can be based at least in part on traffic pattern observations. The traffic pattern observations used by Unified Bandwidth Manager 110 may involve, for example, one or more of various kinds of real-time information on number of active calls, on number of active sessions, call requests per unit time, session requests per unit time, packet loading on particular network Links, and other measurements.

For example, if the number of observed active VoIP calls begins to reach their currently set maximum value limit while other services are currently not near their limit, Unified Bandwidth Manager 110 could adjust the limit for VoIP services upward and some appropriate down adjustment from one or more of the other services not near their limit. The relative sizes of each of these limit adjustments 501-507 can be fine-tuned according to aspects of traffic pattern observations associated with other (non-VoIP) services and the traffic on the network overall.

There are a number of mechanisms the Unified Bandwidth Manager 110 can use to adjust the bandwidth limits for each of the services it manages. In some embodiments, the Unified Bandwidth Manager 110 can change the total amount of provisioned bandwidth that is available to that service. For example, if one service initiates a communication that takes 500 kb/s of bandwidth, the Unified Bandwidth Manager 110 may adjust the maximum provisioned bandwidth for other services by decreasing each service's provisioned maximum by 500 kb/s. Other embodiments may adjust available bandwidth for each service by informing that service of the bandwidth used by other services. Using the example above, rather than decreasing the provisioned maximum, the Unified Bandwidth Manager 110 may inform each service that the amount of "in-use" bandwidth was increased by 500 kb/s. The net result is the same: the amount of available bandwidth for each service was decreased by 500 kb/s. In some embodiments, the Unified Bandwidth Manager 110 may inform an individual service of bandwidth used by other services by creating "pseudo-traffic": the Unified Bandwidth Manager 110 masquerades as one or more endpoints for that service and goes through the process of initiating communications for that service using that service's call setup protocols. The parameters of the call setup are designed to mimic the bandwidth use of other services. Of course, once the call setup is complete, the Unified Bandwidth Manager 110 does not create actual media data, since the call is only setup to mimic media sent by other services. Once the other services terminate their calls, the Unified Bandwidth Manager 110 terminates the corresponding pseudo-calls to mimic the corresponding reduction in bandwidth use.

Figure 6:
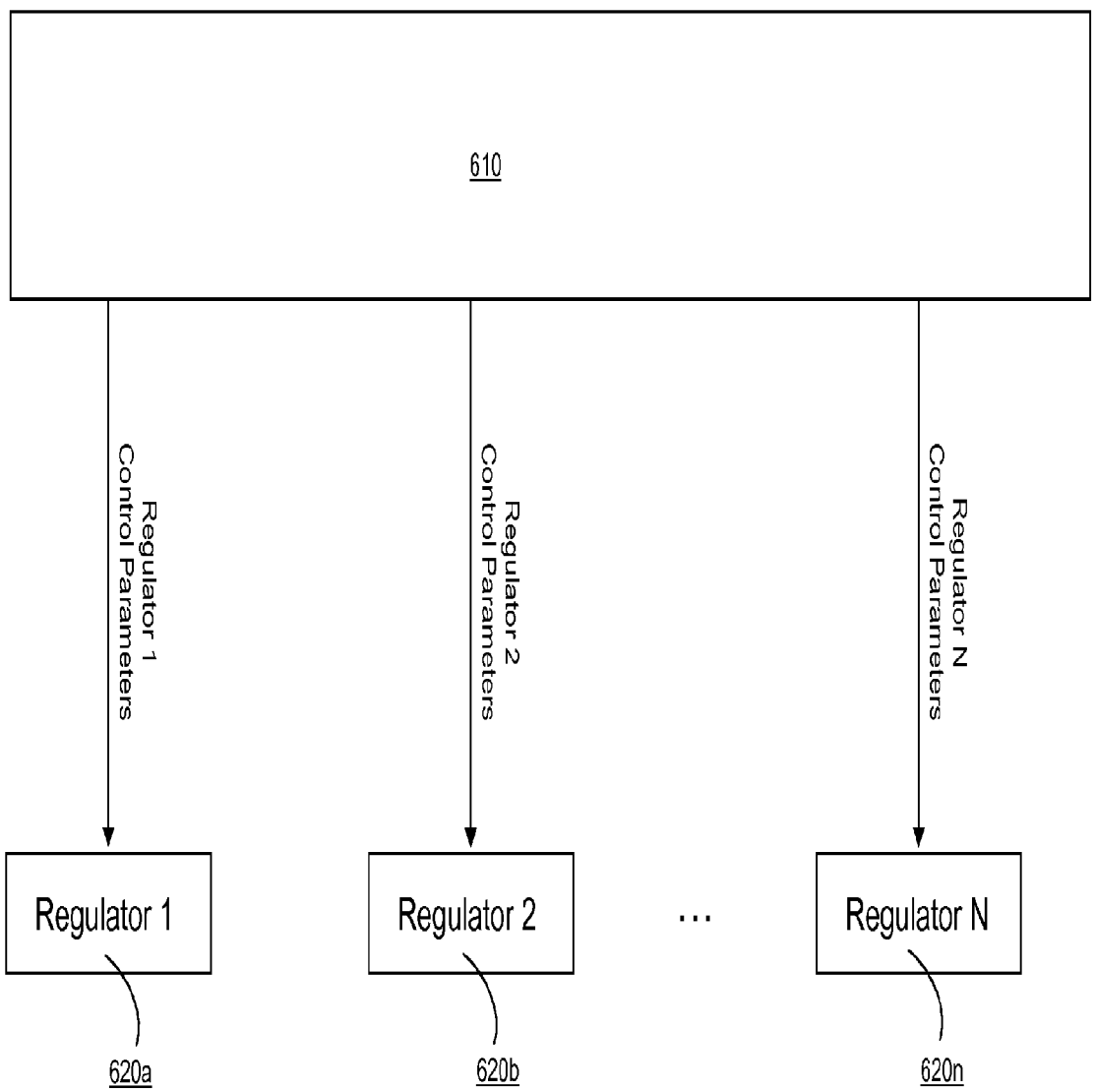
FIG. 6 depicts a high level view of the Unified Bandwidth Manager for controlling the maximum settings of each of the bandwidth reservation systems.

FIG. 6 depicts a high level view 600 of Unified Bandwidth Manager 610 provided with means for controlling the maximum settings of each of the bandwidth reservation systems, illustrated in FIG. 6 as regulators 620. In order for Unified Bandwidth Manager 610 to have the ability to interact with each of the bandwidth reservation systems (regulators) 610 in this way, Unified Bandwidth Manager 610 requires at least some way to control the maximum settings of each of the bandwidth reservation systems involved, as illustrated in the high-level view depicted in FIG. 6. The means for the control information flow may be implemented using one or more of a number of systems and techniques. In one embodiment, a bandwidth reservation system 620 may provide an API that can be used by Unified Bandwidth Manager 610. In another embodiment, a bandwidth reservation system 620 may have a configuration file or database comprising the settings to be adjusted, and Unified Bandwidth Manager 610 is configured to at least write to this file or database. In another embodiment, a bandwidth reservation system 620 offers no direct path to the setting and provides setting adjustment notification and value information to a human operator who subsequently makes adjustment to settings for the bandwidth reservation system 620 through the administrators user interface of the bandwidth reservation system 610.

Figure 7:
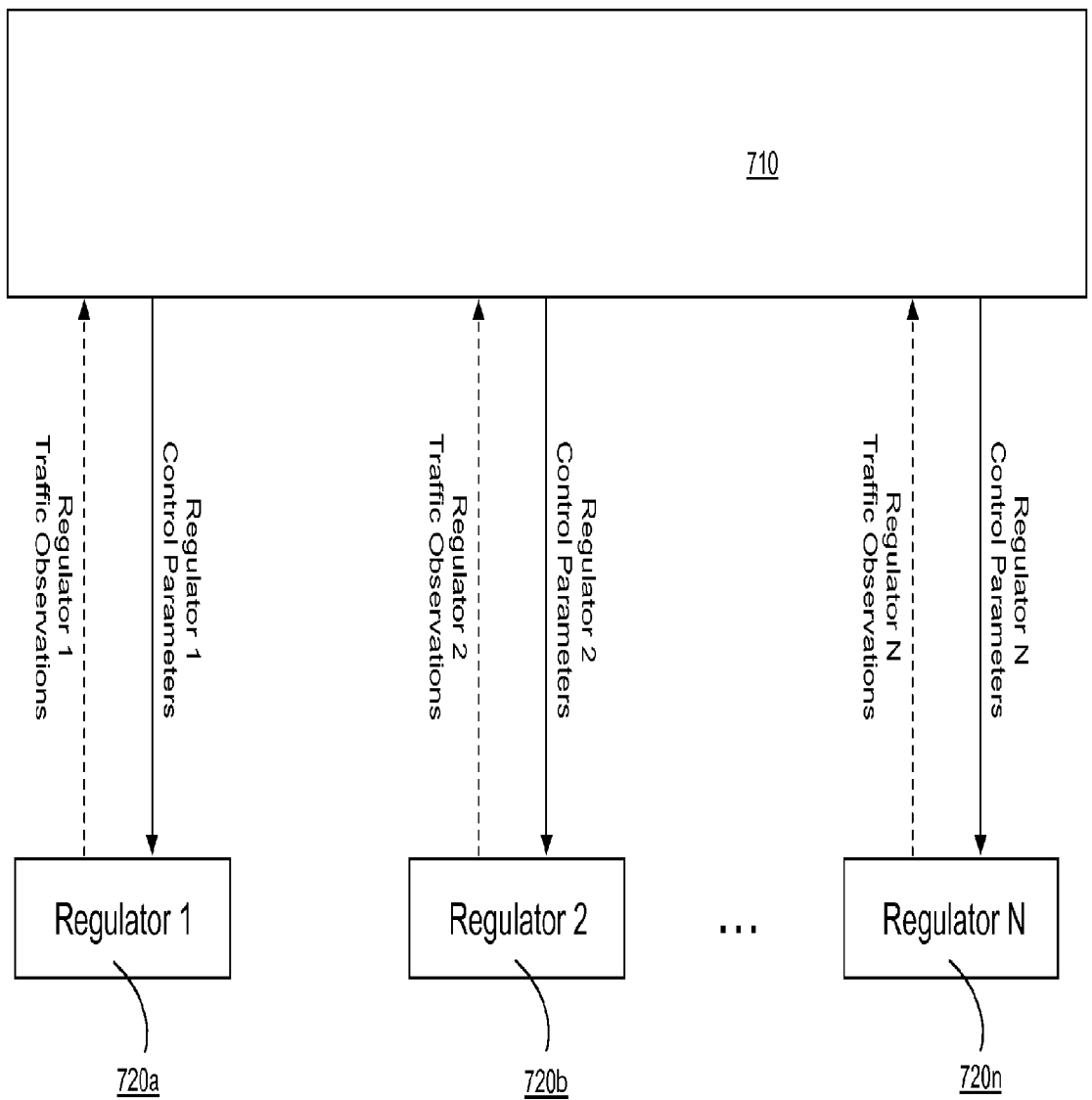
FIG. 7 depicts a high level view of the Unified Bandwidth Manager for controlling the maximum settings of each of the bandwidth reservation systems.

FIG. 7 depicts a high level view 700 of Unified Bandwidth Manager 710 provided with means for controlling the maximum settings of each of the bandwidth reservation systems, illustrated in FIG. 7 as regulators 720. As illustrated, each bandwidth reservation system 710 provides traffic observation information it has (and also current parameter setting information) to Unified Bandwidth Manager 710.

Figure 8:
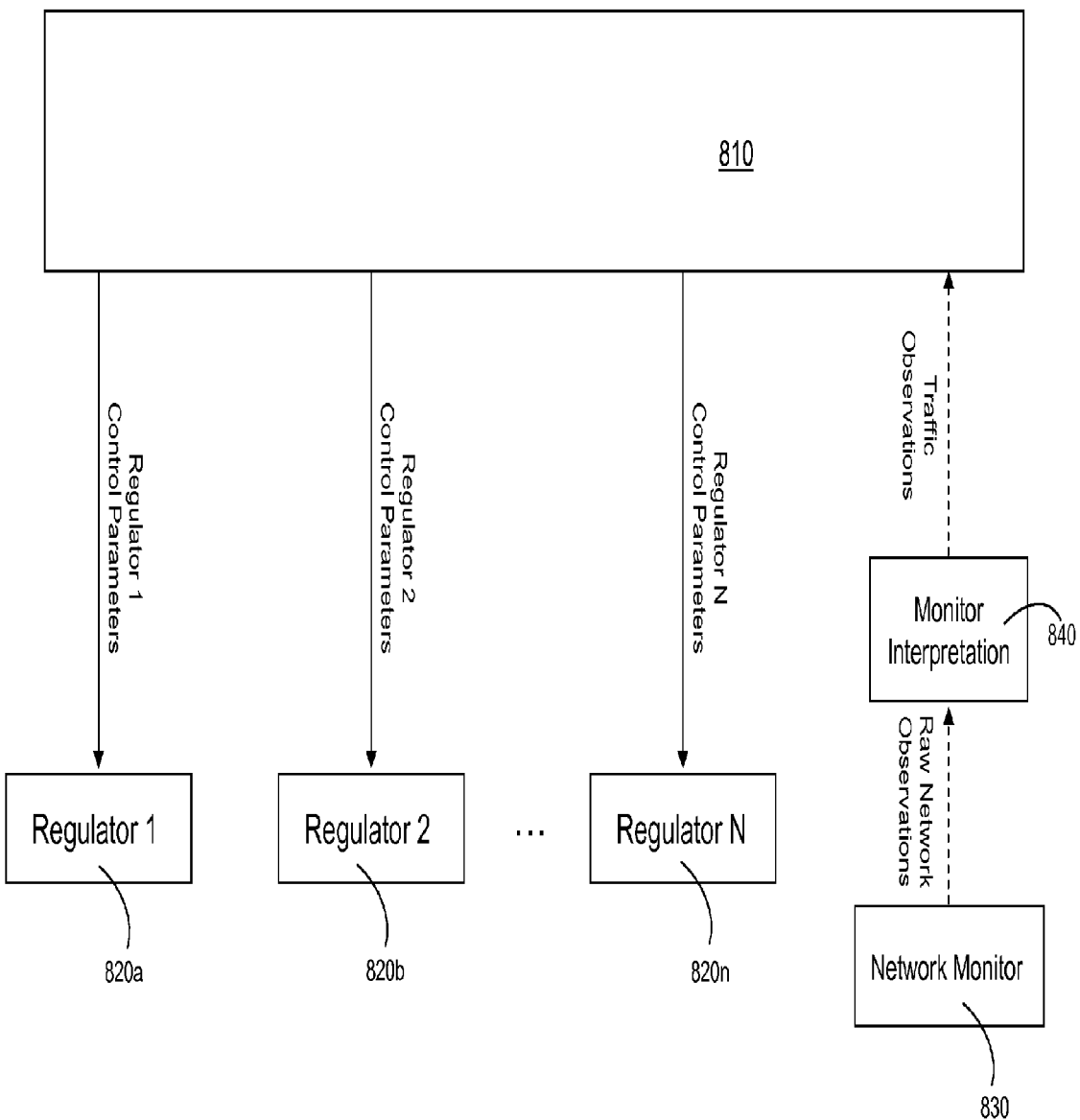
FIG. 8 depicts a high level view of the Unified Bandwidth Manager for controlling the maximum settings of each of the bandwidth reservation systems.

FIG. 8 depicts a high level view 800 of Unified Bandwidth Manager 810 provided with means for controlling the maximum settings of each of the bandwidth reservation systems, illustrated in FIG. 8 as regulators 820. In another embodiment, Unified Bandwidth Manager 810 may not be provided with any traffic pattern observations. In this case it is often possible to use one or more network ("sniffer") monitors 830 to identify quantities of specific types of packets (for example, VoIP transport packets, streaming video transport packets, etc.) seen on the network and capture a copy of specific types of packets (i.e., control message packets) seen on the network. These raw observations may then be interpreted by a software module 840 to produce traffic observations. For example, monitored control packet header and content information can be identified and used to calculate the rate of new call and session requests for one or more types of supported services, the average duration of calls and sessions for these services during a recent interval in time, and other service-specific statistics and attributes that may be useful. These interpreters and models may comprise empirical models made from a priori study and/or run-time estimators and predictors.

Figure 9:
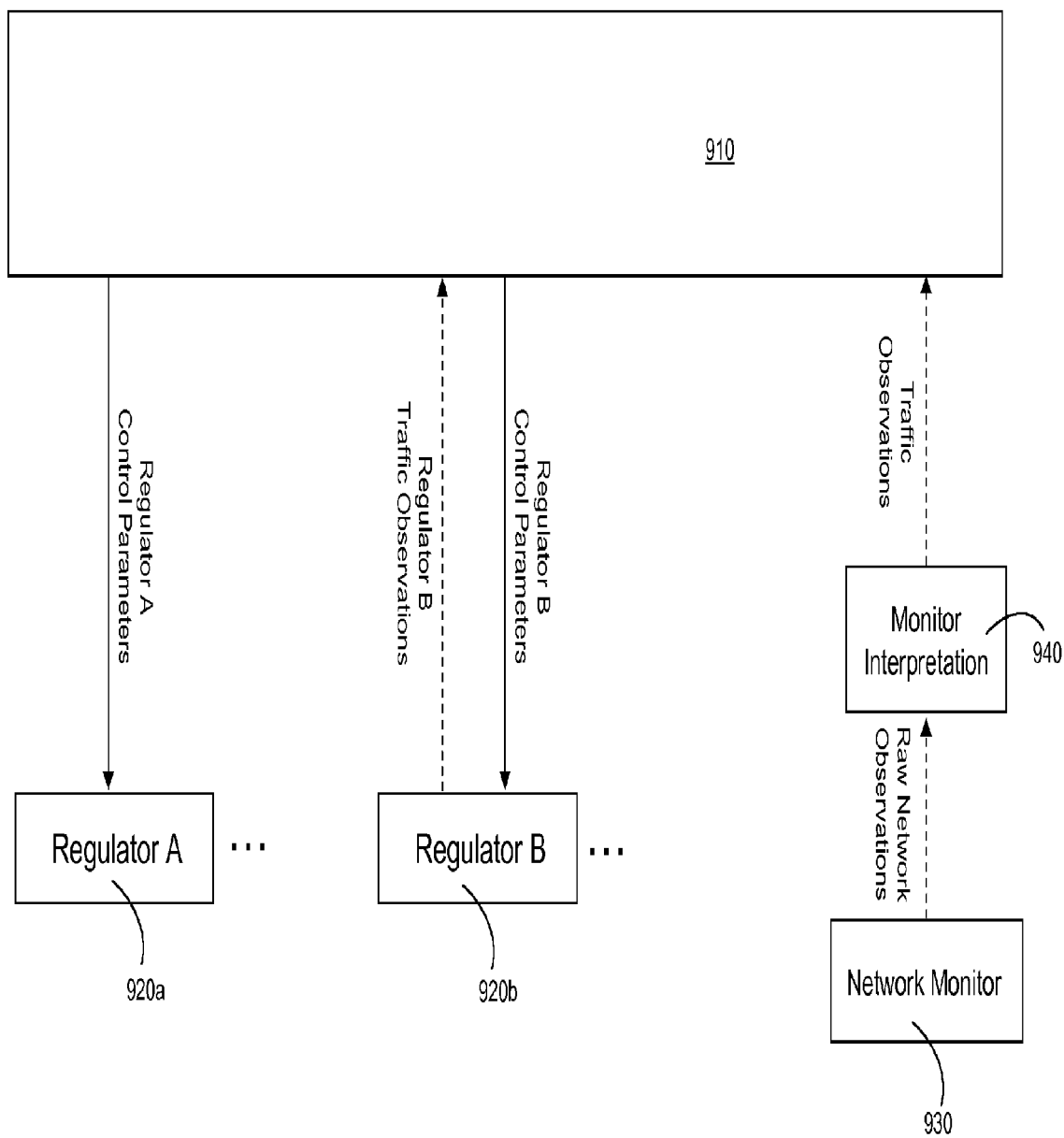
FIG. 9 depicts a high level view of the Unified Bandwidth Manager provided with means for controlling the maximum settings of each of the bandwidth reservation systems.

These two approaches (i.e., those depicted in FIGS. 7 and 8) may also be combined as depicted in FIG. 9. FIG. 9 depicts a high level view 900 of Unified Bandwidth Manager 910 provided with means for controlling the maximum settings of each of the bandwidth reservation systems, illustrated in FIG. 9 as regulators 920. Observations by a network monitor 930 may be used to provide the only traffic observations available for an instance of Regulator A 920*a*. The network monitor observations may also be used to provide the supplemental traffic observations for an instance of Regulator B 920*b* beyond those that are directly provided by Regulator B 920*b*. It is noted the arrangement of FIG. 9 can simultaneously provide for these plus alternative instances of Regulator B 920*b* where information from the network monitor is not used and/or alternative instances of Regulator A 920*a* wherein no traffic observations can be obtained by the network monitor 930. Raw network observations by network monitor 930 may then be interpreted by a software module 940 to produce traffic observations.

Finally, let's consider communications silos 130*a*-130*n* not comprising bandwidth reservation or bandwidth management functionality. For such communication silos 130, the Unified Bandwidth Manager 110 may provide surrogate bandwidth reservation functionality. For example, through use of Proxy Interfaces 126, the Unified Bandwidth Manager 110 could insert itself in the call signaling path for such communications silos 130 and augment those silos 130 with bandwidth reservation and bandwidth management functionality. In some embodiments, the Unified Bandwidth Manager 110 can accomplish this by acting as a SIP proxy server or a SIP B2BUA for SIP-based communications services. In other embodiments, the Unified Bandwidth Manager 110 can accomplish this by acting as an H.323 gatekeeper or neighbor gatekeeper for H.323-based communications silos. In yet other embodiments, the Unified Bandwidth Manager 110 could provide proxy interfaces for other protocols and provide surrogate bandwidth management capabilities for communications silos that use those protocols.

In addition to providing surrogate bandwidth management, the Unified Bandwidth Manager 110 may use other mechanisms to control communications silos 130 that do not include bandwidth reservation or bandwidth management functionality. For example, the Unified Bandwidth Manager 110 could provide call admission control by terminating those calls that cannot be supported on the available bandwidth. This can be done by communicating with the communications silo 130 using any of the mechanisms described above. Alternatively, the Unified Bandwidth Manager 110 can provide call admission control or other bandwidth control strategies by communicating directly with the underlying network equipment (such as routers and switches). Depending on the capabilities, such network equipment can be instructed to block traffic associated with specific calls or to limit the bandwidth associated with specific calls, where calls can be uniquely identified by source and destination IP addresses and IP ports.

Communications Between Regulators and Unified Bandwidth Manager

Attention is now directed to implementation of communications between individual bandwidth reservation system (regulators) and Unified Bandwidth Manager 110.

Figure 10:
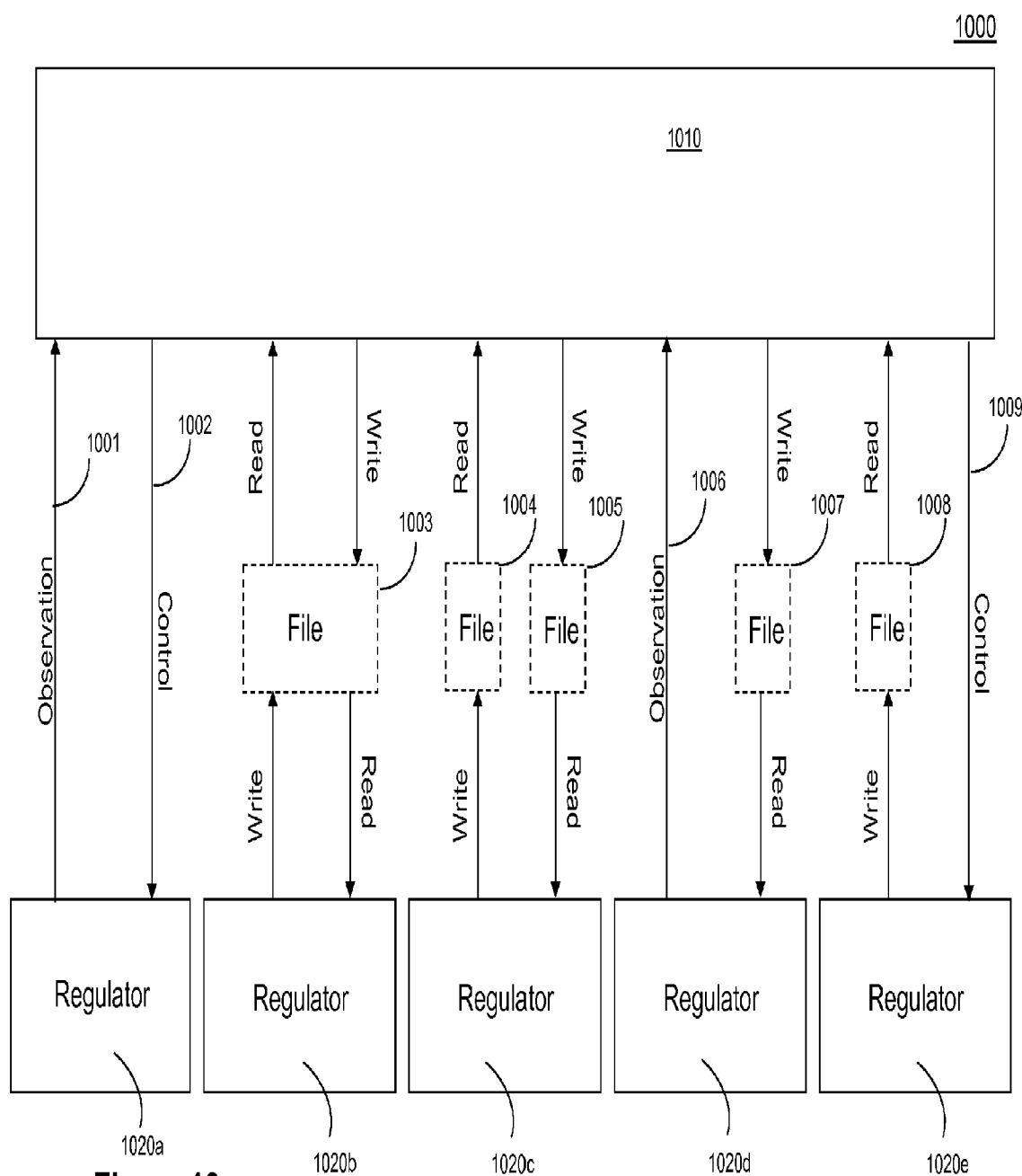
FIG. 10 illustrates examples in which individual call or session admission regulators within the bandwidth reservation systems may communicate with a Unified Bandwidth Manager.

FIG. 10 illustrates examples in which individual call or session admission regulators within the bandwidth reservation systems may communicate with a Unified Bandwidth Manager 110. These pertain to communications depicted, for example, in FIGS. 6-9. Although two-way communication is depicted, it is understood by one skilled in the art that one-way communication implementations are readily adapted from the examples of two-way communication implementations to be discussed. Further, it also understood by one skilled in the art that any of these may be combined with network monitor observations as described earlier in conjunction with FIGS. 8 and 9. Further, it additionally understood by one skilled in the art that a single bandwidth reservation system (regulator) 1020 may itself employ one or more of any of the communication implementations to be described, i.e., any may be used and two or more may be combined.

FIG. 10 illustrates implementing one path in each direction of communication between a bandwidth reservation system (regulator) 1020 and Unified Bandwidth Manager 1010. In one embodiment, this communication is implemented using an API provided by the manufacturer of the bandwidth reservation system (regulator) 1020. In this or other embodiment, DLLs, TCP communications paths, HTTP, XML, and/or sockets may be used to realize either or both of the observation communications 1001 and the control communications 1002. The API provided by a manufacturer for a bandwidth reservation system product may be a static configuration API or may comprise a dynamic reservation capability.

In another embodiment, the communications may be through reading and writing of one or more files or databases. In one approach to this type of embodiment, such a file may reside on a server. In another approach to this type of embodiment, such a file may reside on a distributed replicated database. In another approach to this type of embodiment, such a file may be transferred via a file transfer operation. In another approach to this type of embodiment, such a file may be transferred HTTP. In another approach to this type of embodiment, such a file may be transferred via a messaging operation. In another approach to this type of embodiment, such a file may be transferred via an operation involving an email transaction.

There may be a common file or database 1003 comprising both control and observation information. In another embodiment, there may be a file or database 1004 comprising observation information and another file or database 1005 comprising control information. In another embodiment, there may be a DLL, TCP, HTTP, XML, and/or socket communications path 1006 comprising observation information and a file 1007 comprising control information. In another embodiment, there may be a file or database 1008 comprising observation information and a DLL, TCP, HTTP, XML, and/or socket communications path 1009 comprising control information.

The communications mechanisms now established, it is noted that each manufacturer is likely to have their own variation as to the presence, types and forms for the information being communicated in this fashion. Until standards are established or partnerships make uniform interfaces possible, Unified Bandwidth Manager 1010 must interact with each commercial bandwidth reservation system product on a "take what you can get," "be glad you even get this much," and "as is" basis. Thus, typically a control action to be invoked by Unified Bandwidth Manager 1010 may require at least some sort of translation into the native terms indigenous to the associated commercial bandwidth reservation system product. Similarly, traffic pattern observations will require at least a similar type of translation if not a more complex interpretation function.

Figure 11:
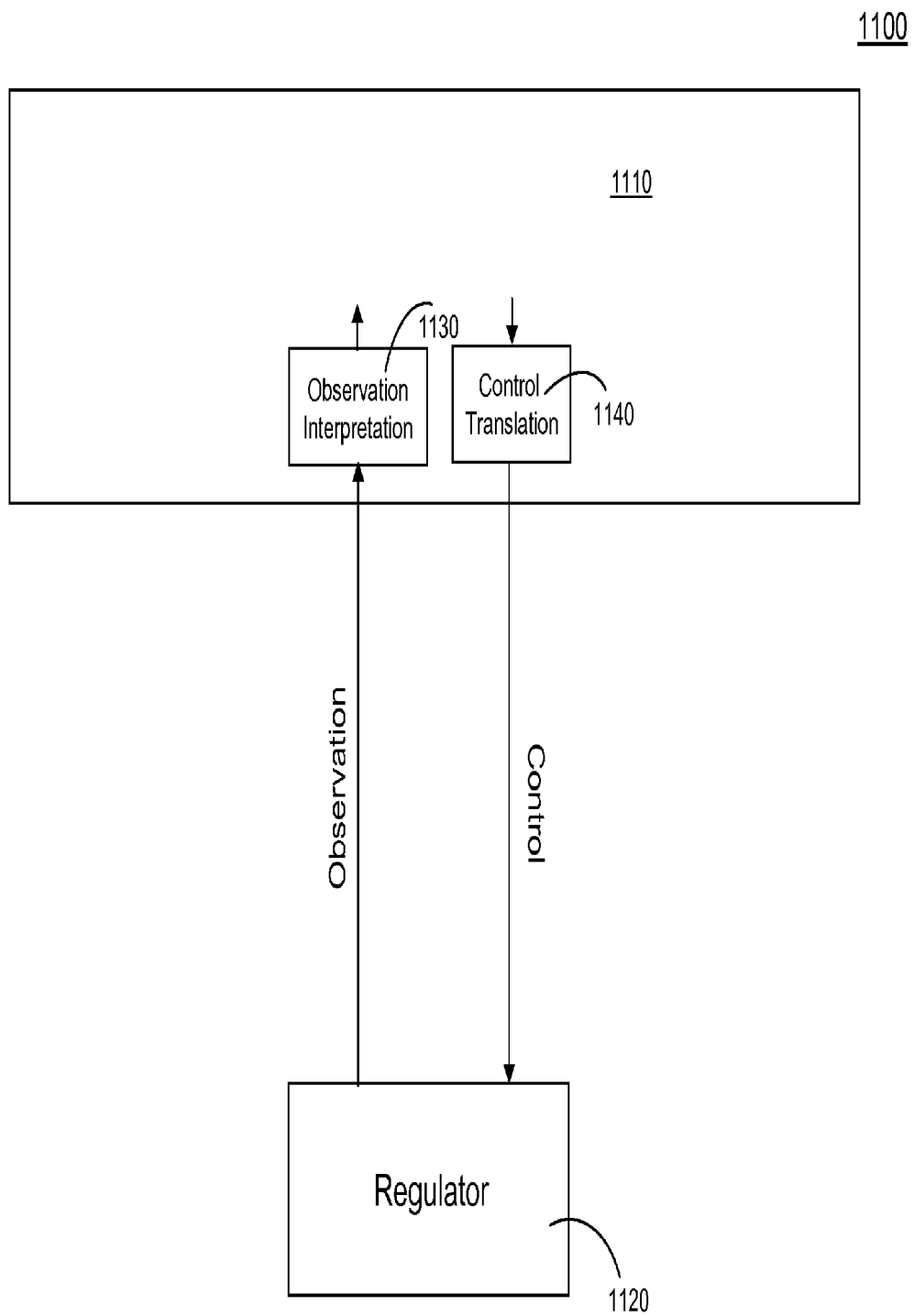
FIG. 11 illustrates embodiments of a system in which observation interpretation and translation functions within the Unified Bandwidth Manager are used in interactions with bandwidth reservation systems (regulators).

FIG. 11 illustrates a system 1100 in which observation interpretation 1130 and translation functions 1140 within Unified Bandwidth Manager 1110 are used in interactions with bandwidth reservation systems (regulators) 1120. In some situations no translation or interpretation may be needed, and in other situations the observation communications path may only require a relatively simpler translation function, while in other situations the control communications path may require a sophisticated interpretation function.

With these communications aspects established, attention is now directed to implementations of the Unified Bandwidth Manager 110. In one embodiment, the Unified Bandwidth Manager 110 integrates the communications silo parameter settings, policies, etc. into a top-down unified control console for operation by network administration staff. In another embodiment, this arrangement additionally provides a unified reporting platform for providing observation information obtained from the communications silos 130 and any network monitors, interpreters, and so on. In another embodiment, this arrangement additionally provides a multi-service performance calculation system for allowing network administration staff to interactively explore various "what-if" scenarios. Such a calculator may employ, for example, the Kaufmann-based multiservice blocking model with adjustable state-space truncations that is subsequently described. In another embodiment, the Unified Bandwidth Manager 110 provides a closed loop control system for automatically adjusting parameters and/or policies of individual communications silos 130 in response to network administrator input and/or measured network capacity and/or measured network performance. In another embodiment, the Unified Bandwidth Manager 110 employs a hierarchical control system supporting at least one of goals and/or policies as may be set by network administration staff. Structural aspects of a closed loop and hierarchical control system are described in the material to follow.

Structural Aspects of a Hierarchical Control System

Attention is now directed to structural aspects of a hierarchical control system. A Unified Bandwidth Manager 110 is employed using a hierarchical control system.

Figure 12:
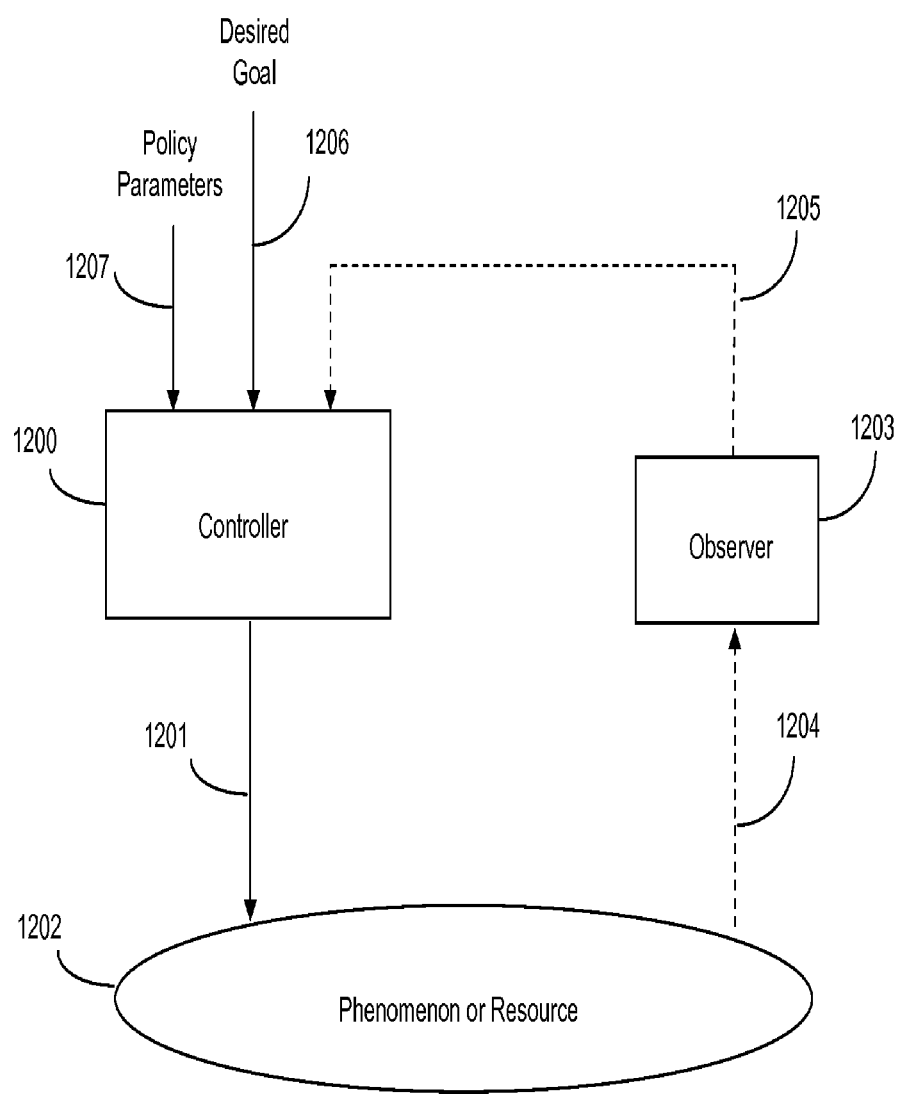
FIGS. 12-14 illustrate an example of regulation system within the Unified Bandwidth Manager.

FIG. 12 illustrates a regulation system 1250. Regulation system 1250 can be used to represent selected aspects of commercial bandwidth reservation system products afore discussed. A controller 1200 takes a controlling action 1201 on a phenomenon or resource 1202 (here relating to call admissions, bandwidth usage, etc.) its current state is observed by an observation entity 1203 (usually called "observer" by those skilled in the art). The observer 1203 observes measures, monitors 1204 the controlled phenomenon or resource 1202 by means or methods appropriate and provides observation information 1205 to the controller 1200 in a form the controller can use to control the phenomenon or resource 1202. The controller 1200 in this model is further provided with desired goal information 1206. For example, a home heating system taken as such a system 1200 would have home air serving as phenomenon or resource 1202, a thermostat setting serving as desired goal information 1206, a temperature sensor serving as observer 1203, the air temperature serving as the measurement means 1204, an electrically-controlled heating unit serving as the controller 1200, and the signal from the temperature sensor (observer 1203) to the heating unit (controller 1200) serving as observation information 1205. The controller 1200 interaction with the phenomenon or resource 1202 has an inherent type of dynamics (in the home heating example, how long it takes the running heating unit to raise the temperature by 1 degree in a designated part of the home) and the resulting feedback loop 1201, 1204, 1205 with these controller dynamics and observer 1203 characteristics produce a closed-loop behavior (for example, a heating temperature undershoot or overshoot that causes discomfort in some part of the home separate from the temperature sensor until the room temperature throughout the home stabilizes).

The controller 1200 is additionally provided with policy parameter information 1207 that can be used to control the behavior of the closed loop control system 1250. For the home heating example, the heating unit may pulsate on or off with a varying duty cycle that can be adjusted for the particulars of the home, or a hysteresis gap in the heater response than can be narrowed or widened according to the particulars of the home. It is typically not feasible to provide a wide range of policies, so in practice there is a selection of policies or a collection of policy variables that can be adjusted. In FIG. 12 these are therefore represented as "policy parameters" 1207.

Figure 13:
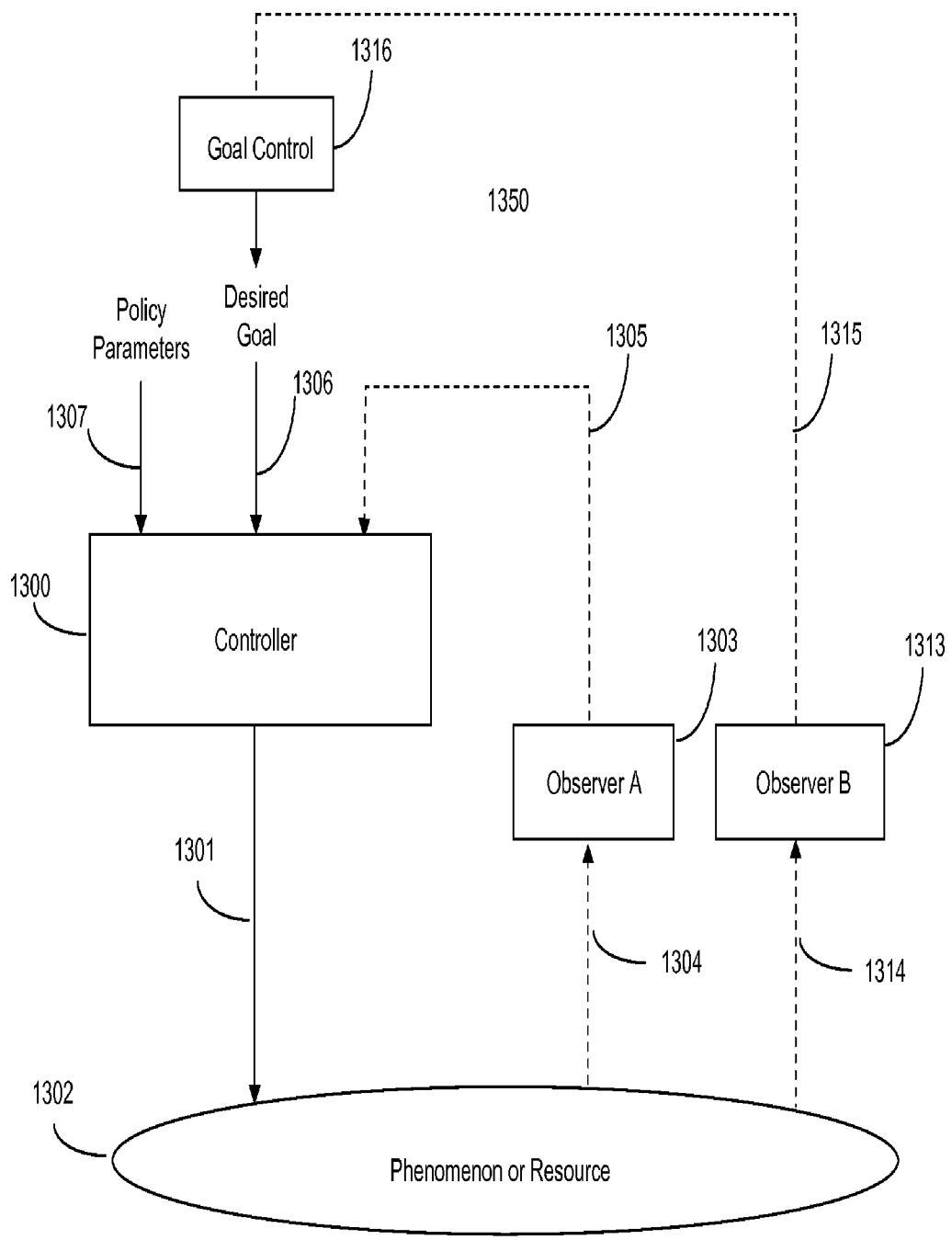

FIG. 13 illustrates a regulation system 1350. FIG. 13 is similar to FIG. 12 except that in FIG. 13, a second observer 1313 is also added for observing, measuring, and/or monitoring 1314 the phenomenon or resource 1302 and producing observation information 1315 directed to a goal controller 1316 that adjusts the desired goal 1306 in the system depicted in FIG. 12. In the home heating example, observer B 1313 may note that the air is too cool for someone with an illness who is in the house, and adjust the temperature setting accordingly. For a given desired goal setting, the inner feedback loop 1301, 1304, 1305 with the controller dynamics and observer characteristics produce a closed-loop behavior like the framework system depicted in FIG. 12.

Figure 14:
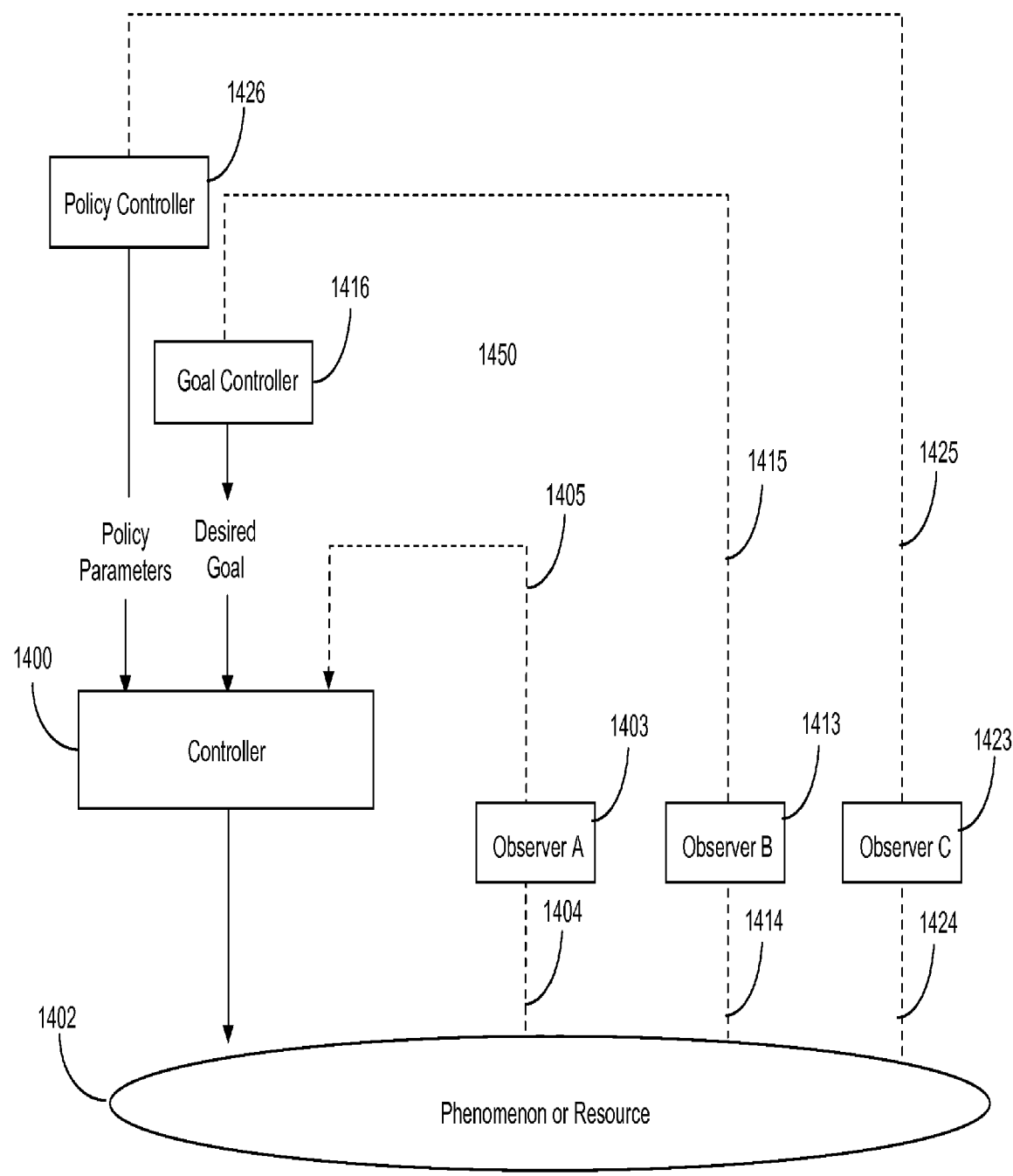

FIG. 14 illustrates a regulation system 1450. FIG. 14 is similar to FIG. 13 except that in FIG. 14, a third observer 1313 is also added for observing, measuring, and/or monitoring 1414 the phenomenon or resource 1402 and producing observation information 1415 directed to a policy controller 1416 that adjusts the policy 1407 in the systems depicted in FIGS. 12 and 13. For example, in the home heating example, the controller 1400 may include adjustable parameters as to how long the fan runs after the heating element is turned off and a pause time before the heating element is turned on again. Observer C 1425 may monitor the temperature in various parts of the home, and the policy controller may adjust these fan intervals and pause interval settings based on the information 1425 from Observer C 1423.

In reference to FIG. 14, in some embodiments, the goal observer 1413 and goal controller 1416 functions are provided by a Unified Bandwidth Manager 110 to a controller 1400. In some embodiments, the policy observer 1423 and policy controller 1426 functions are provided by a Unified Bandwidth Manager 110 to a controller 1400.

Figure 15:
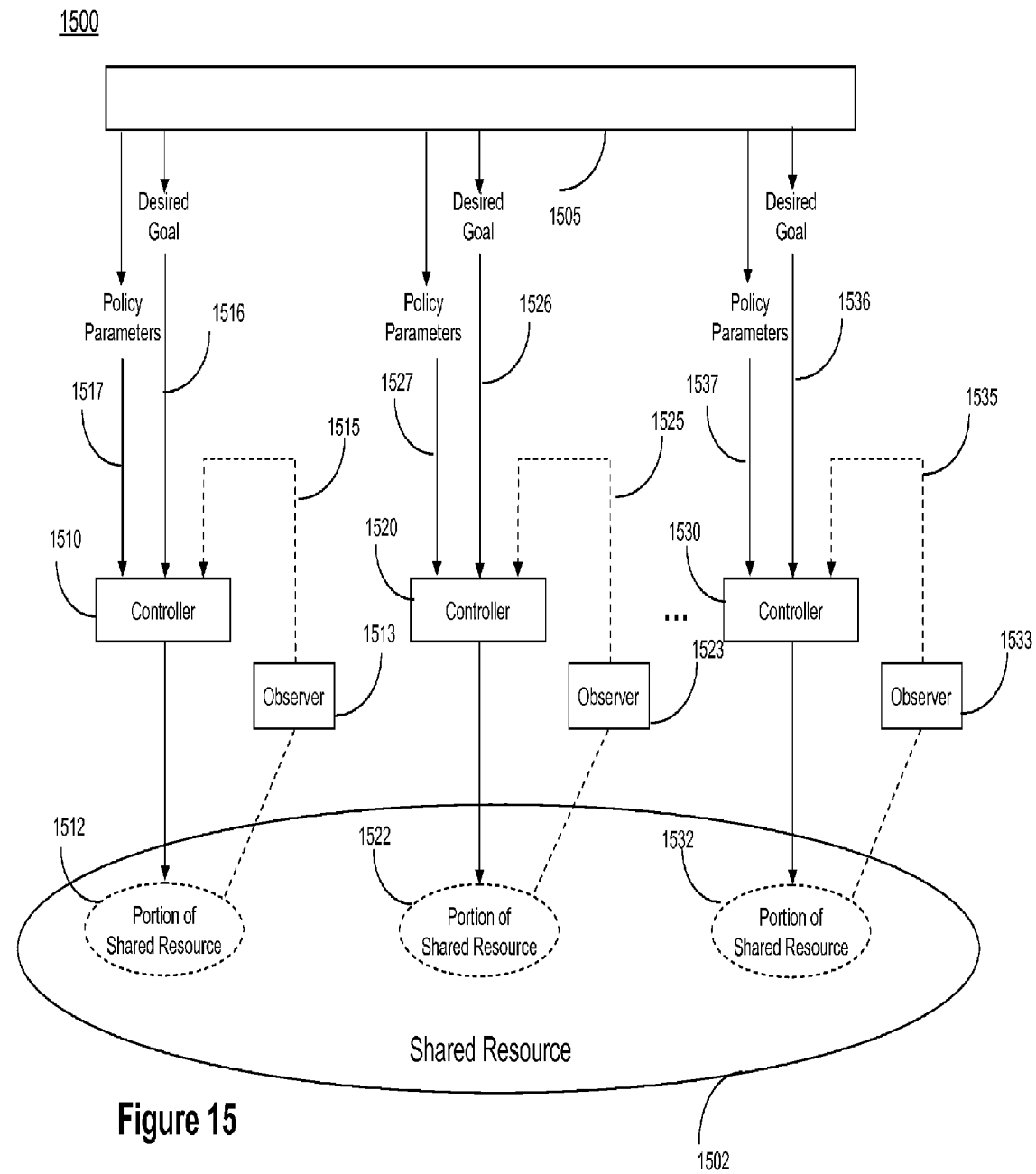
FIG. 15 illustrates a system including a Unified Bandwidth Manager, a shared resource and a plurality of framework controllers.

FIG. 15 illustrates a system 1500 including a Unified Bandwidth Manager 1505, a shared resource 1502 and a plurality of framework controllers 1510, 1520 and 1530. In some embodiments, the framework controllers 1510, 1520 and 1530 are those discussed above with reference to FIG. 12. In some embodiments, each framework controller 1510, 1520 and 1530 stands in for a commercial bandwidth reservation systems in the communications silos 130a-130n of FIG. 1, and each respectively controls an associated portion 1512, 1522, 1532 of common shared resource 1502, such as enterprise network bandwidth.

Products vary from manufacturer to manufacturer, but typically each bandwidth reservation system product at the very least would comprise at least the controller 1510, 1520, 1530 and observer 1513, 1523, 1533 entities and the desired goal settings 1516, 1526, 1536. Most would additionally include at least some type of observer information path 1515, 1526, 1536, and at least some would utilize the resulting feedback loop. In this case, the desired goal settings 1516, 1526, and 1536 correspond to the maximum allowed number of calls or sessions for the associated service, as described earlier. Additionally, some products would also provide for policy parameter settings 1517, 1527, 1537, and, in reference to FIG. 14, may even internal provide some type of associated policy-oriented observer 1423 and observation 1425 directed to a policy controller 1426 so as to provide a policy feedback loop.

In some embodiments, the Unified Bandwidth Manager 1505 provides at least the policy observer and goal controller functions, such as policy observer 1423 and goal controller 1416 functions of FIG. 14, to at least the plurality of the controllers 1510, 1520, 1530 depicted in FIG. 15.

In some embodiments, the Unified Bandwidth Manager 1505 provides at least the policy observer 1423 and goal controller 1426 functions depicted in FIG. 14 to at least a plurality of the controllers 1510, 1520, 1530 depicted in FIG. 15. In some embodiments, the Unified Bandwidth Manager 1505 provides at least the observers 1513, 1523, 1533 depicted in FIG. 15.

Controlling Call Admission, Session Admission, and Underlying Shared Enterprise Bandwidth With these structural aspects of the hierarchical control system established, attention is now directed to how call admission, session admission, and underlying shared enterprise bandwidth are controlled so as to realize the adjustable bandwidth allocations described earlier in conjunction with FIG. 5.

Figure 16A:
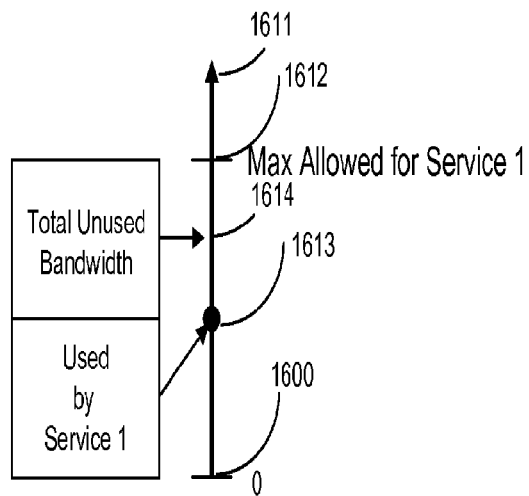
FIGS. 16a-16c depict the construction of a sequence of representations ("state-spaces") of instantaneous service usage (or service demand) that can be used for resource allocation.
Figure 16B:
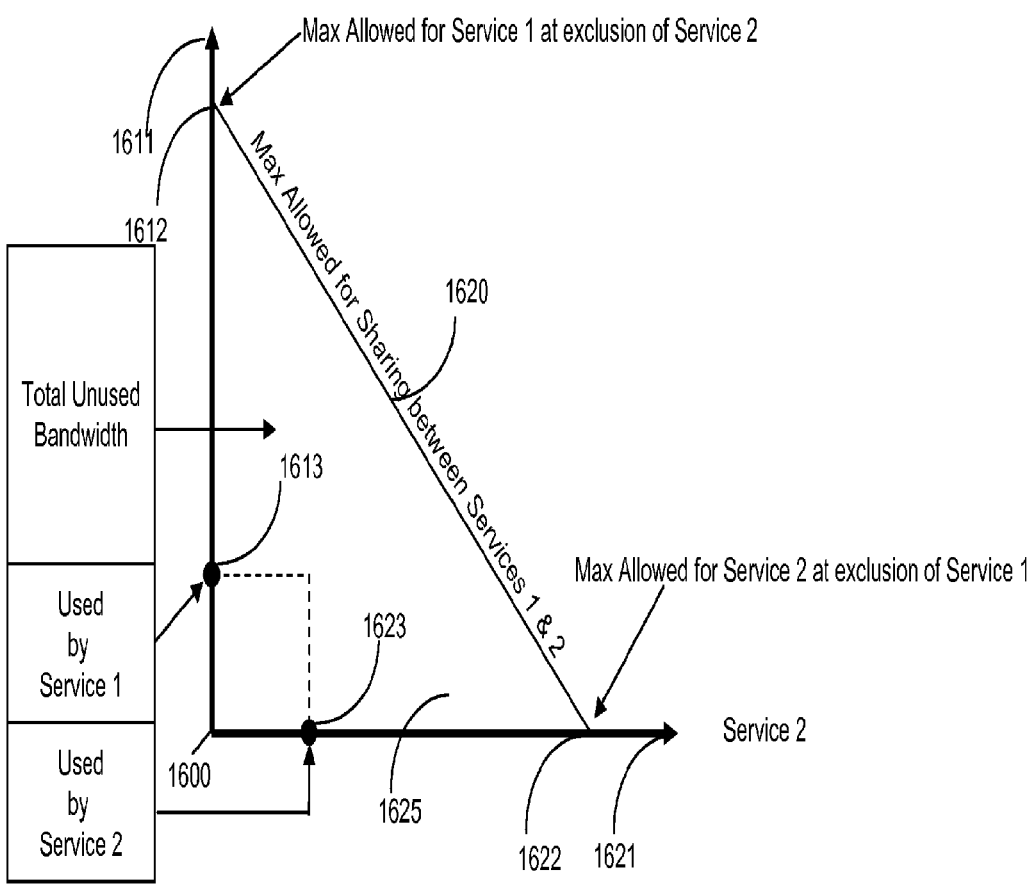
Figure 16C:
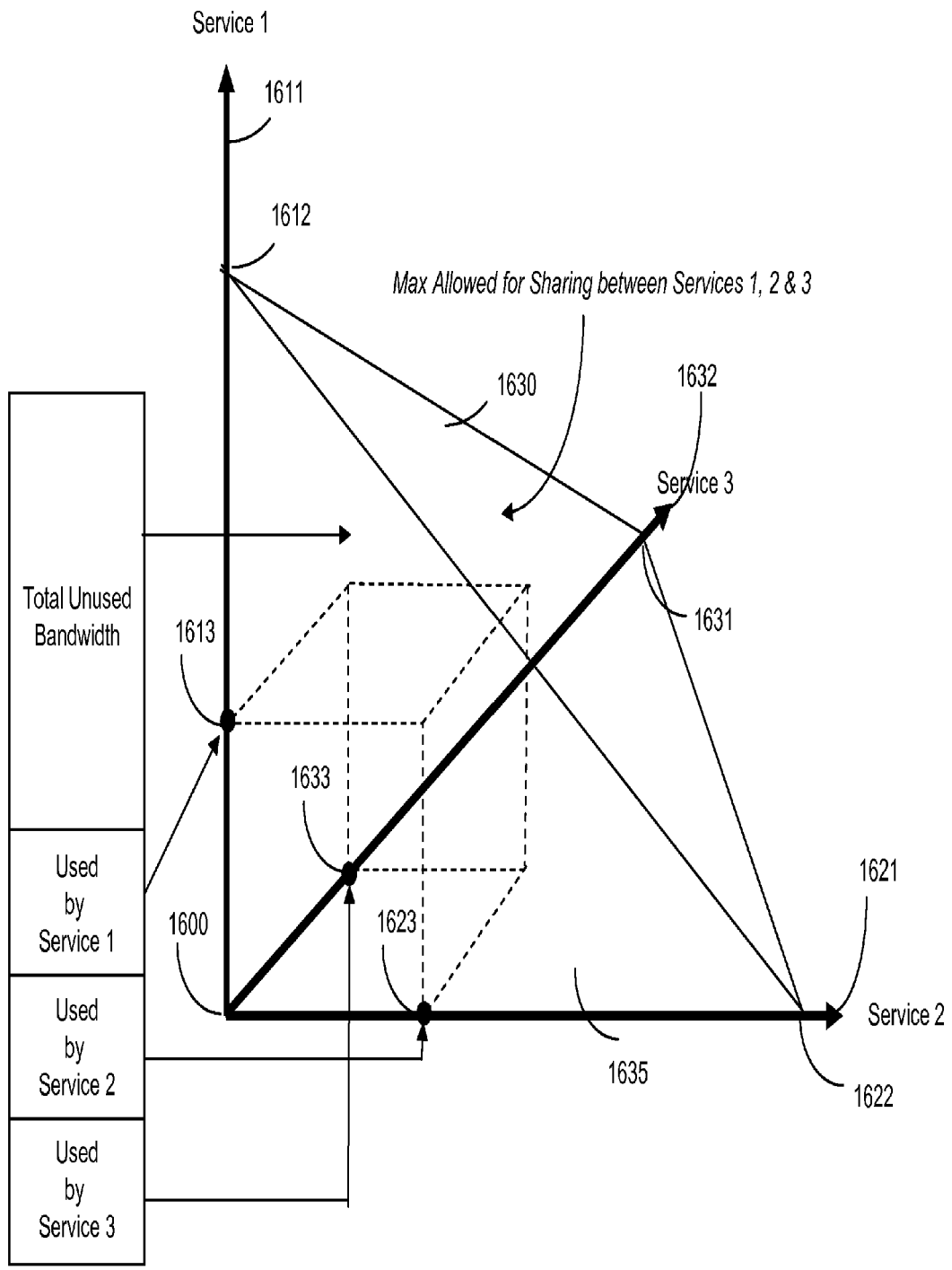

FIGS. 16a-16c depict the construction of a sequence of geometric mathematical representations ("state-spaces") of instantaneous service usage (or service demand) that can be used for stochastic blocking-oriented performance prediction and other types of shared-constraint resource allocation computations. FIG. 16a depicts a case where there is only a single service, FIG. 16b depicts a case with two services, and FIG. 16c depicts a case with three services.

FIG. 16a depicts a case with only a single service "Service 1." For example, Service 1 may be a VoIP service operated under the control of an associate bandwidth reservation system. In FIG. 16a, the amount of bandwidth carved out for Service 1 determines the maximum number of Service 1 VoIP calls that can be allowed. This sets a maximum permitted extreme 1612 on a single axis or scale 1611 associated with Service 1. At any moment in time, the number of active calls (or in another type of design, demand for calls) lies at a point 1613 on this axis or scale 1611 in the interval between the zero value 1600 and the maximum permitted extreme 1612. The amount of unused bandwidth carved out only for Service 1 and not available to other bandwidth reservation systems comprised by other communications silos 130 is the interval 1614 bounded by the number of active calls 1613 and the maximum permitted extreme 1612.

FIG. 16b expands the single service case of FIG. 16a into an arrangement accommodating two services, Service 1 and Service 2. Here, two scales or axes are used, one axis 1611 for Service 1 and another orthogonal axis 1621 for Service 2. At any moment in time, the number of active calls for Service 1 lies at a point 1613 on this axis or scale 1611 in the interval between the zero value 1600 and the maximum permitted extreme 1612. Similarly, at any moment in time, the number of active calls for Service 2 lies at a point 1623 on this axis or scale 1621 in the interval between the zero value 1600 and the maximum permitted extreme 1622. Here, by virtue of control by the Unified Bandwidth Manager 110, unused bandwidth is pooled into a common group 1625 for potential reallocation. Because the total bandwidth used in this two service system must be the sum of the bandwidth used by Service 1 and bandwidth used by Service 2, the boundary for the permissible combinations is a line segment with negative slope 1620 connecting the external values 1612, 1622 for Service 1 and Service 2.

FIG. 16c expands the single service case of FIG. 16a and the dual service case of FIG. 16b into an arrangement that accommodates three services, Service 1, Service 2, and Service 3. Here, three scales or axes are used, one axis 1611 for Service 1, another orthogonal axis 1621 for Service 2, and a third orthogonal axis 1631 for Service 3. At any moment in time, the number of active calls for Service 1 lies at a point 1613 on this axis or scale 1611 in the interval between the zero value 1600 and the maximum permitted extreme 1612. Similarly, at any moment in time, the number of active calls for Service 2 lies at a point 1623 on this axis or scale 1621 in the interval between the zero value 1600 and the maximum permitted extreme 1622. Similarly, at any moment in time, the number of active calls for Service 3 lies at a point 1633 on this axis or scale 1631 in the interval between the zero value 1600 and the maximum permitted extreme 1632. Again, by virtue of control by the Unified Bandwidth Manager 110, bandwidth not used by Service 1, Service 2 and Service 3 can be pooled into a common group 1635 for potential reallocation. Because the total bandwidth used in this two service system must be the sum of the bandwidth used by Service 1, the bandwidth used by Service 2, and the bandwidth used by Service 3, the boundary for the permissible combinations is a triangular plane section with negative slope 1630 connecting the external values 1612, 1622, 1632 for Service 1, Service 2 and Service 3.

This procedure depicted in FIGS. 16a-c can be extended to include more services with associated bandwidth reservation system so as to produce state spaces with higher dimensions. The limiting point 1612 in FIG. 16a, limiting line segment 1622 in FIG. 16b, and limiting plane section 1632 of FIG. 16c generalize to a hyperplane of dimension one less than the number of services in a state space whose number of dimensions equal the number of services. The respect line segment, area, and volume of FIGS. 16a-16c bounded by the axes, the zero point 1600, and the limiting point/line/plane are respectively one, two, and three dimensional simplexes. All possible permissible combinations of allocations across the services lie within or on the borders of these simplexes. For N services, then, all permissible allocation combinations within the control of the combination of the Unified Bandwidth Manager 110, with the N instances of bandwidth reservation system products controlled by the Unified Bandwidth Manager 110 lie within such an N-dimensional simplex. It is important property that the points within such a simplex of any dimension can readily be sequenced by nesting of counting loops (such as a "DO-loop") as is well known to those familiar computer programming. For example, for an N-dimensional simplex, N separate nested "DO-loops" may be used with interdependent iterating counting limits.

In the case of calls and sessions such as the Unified Bandwidth Manager 110 and controlled bandwidth reservation system products would expect to manage, it is empirically common that, at least piece-wise in time throughout the business day, call and session requests arrive independently of one another. This gives rise to fairly accurate modeling of the time behavior of incoming requests for calls and sessions, within at least piece-wise segments of the business day, by a stochastic process known as the Poisson process. Similar independence structures can be used to model the duration of time the call or session; these lead to an exponential probability distribution for the call or session duration. Together these create a well-vetted process for modeling blocking and resource allocations. As call arrival rates vary during a business day (for example busy hour, lunch hour, special events), a single parameter in the Poisson rate can be adjusted and the model will still largely apply.

Note this mathematical structure fits the call and session request process quite well, but does not apply to the time process for the underlying generation of individual packets. The number of active calls and sessions will modulate the rates of underlying packet generation, and thus directly correspond to a time-average of packet loading. However, in general, the statistics of individual packet generation rates is quite different from a Poisson arrival/exponential duration model. In some embodiments, the Unified Bandwidth Manager 110 may model the time process of individual packet generation.

For calculating what level of blocking probability that call and session requests would be expected to experience for a single service exclusively drawing from shared resource (i.e., the case of FIG. 16a), well-know formulas and functions such as those attributed to and known as Erlang and Engset are used. It turns out that these formulas can be quite forgiving of the duration time probability distribution. Importantly, well-known algorithms are available for numerically calculating these Erlang and Engset blocking formulas.

For calculating what amount of resource available in the shared resource pool drawn upon by call or session requests of a single service so as to guarantee a maximum level of blocking, the Erlang and Engset blocking formulas may be inverted. Such inversion may be accomplished by putting an algorithm for the Erlang and Engset blocking formulas within a conditional counting loop, but other more sophisticated algorithms are widely known and can be readily applied by one skilled in the art of telephone traffic engineering. The inverted Erlang and Engset blocking formulas will be used in some embodiments of the control system, but they may be first extended to handle multiple services, particularly where the average bandwidth of each service is appreciably different. This is commonly the case; a (one-way) streaming audio session may use 16 kB to 32 kB per second, a (two-way) VoIP call may use twice this range, and a (two-way) point-to-point video session may use 200 kB to 800 kB per second.

If the empirically well-fitting Poisson arrival/exponential duration approximate statistics are in fact utilized for more of their mathematical power, they can be leveraged to address this problem. The Poisson arrival/exponential duration statistics impose a time-reversal symmetry, mathematically giving rise to an adjoint-like structure to the transition probabilities between states. Theorems of Kelly and others show that a brute force transition probability lattice can be constructed, only the points within the simplex need be kept, and the total sum of probabilities of each surviving state transitions can be used to renormalize the individual state transition probabilities. Further, this holds if the simplex is tilted in various ways. The simplex limit points at the axes can be scaled according to relatively how many service instances are permitted for the associated service multiplied by the relative amount of underlying resource one instance of that service uses. Thus, to handle multiple services with differing bandwidth requirements, call/session request arrival rates, and call/session durations, quite simple algorithms, very similar to those to numerically compute single service Erlang and Engset blocking formulas, can be used. Further, the average call/session arrival rate multiplied by the average call duration provides a well-known quantity called the traffic intensity, and this traffic intensity quantity is all that is needed from traffic observations for blocking calculations.

These properties will leverage further to address fairness among allocations within the collection of services. First, some examples are provided for applying the above to a two-service system.

Figure 17A:
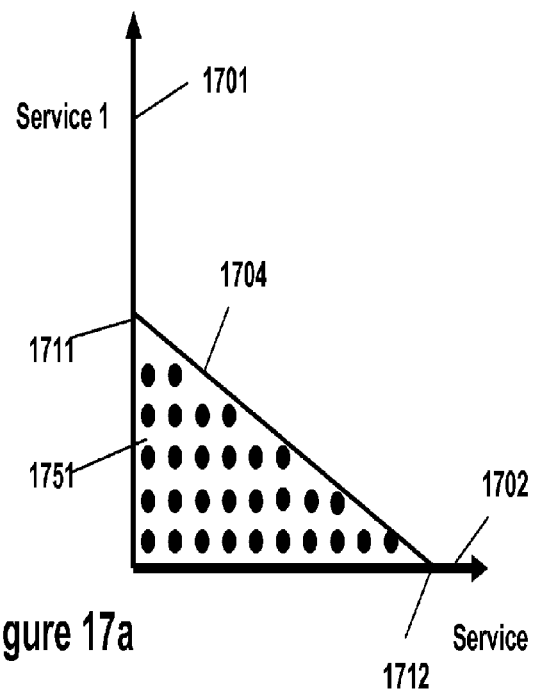
FIG. 17a illustrates a geometric representation for the sharing of network bandwidth or other shared resources between two types of calls or sessions.
Figure 17B:
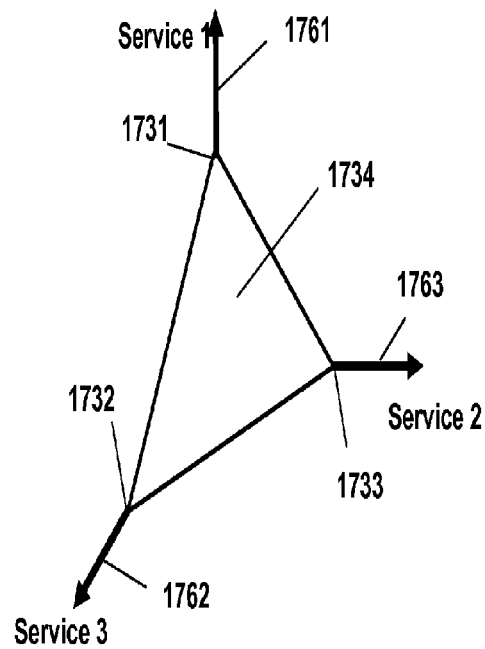
FIG. 17b illustrates a geometric representation for the sharing of network bandwidth or other shared resources between three types of calls or sessions.

FIG. 17a illustrates such a geometric representation for the sharing of network bandwidth resources between two types of calls or sessions whose bandwidth requirements are roughly in a 2:1 ratio. FIG. 17b illustrates a generalization of FIG. 17a to include a third service. Here the region of permissible states takes the form of a three-dimensional simplex.

FIG. 17a illustrates a two-axis plot, that includes a vertical axis 1701 measuring the number of simultaneously active service sessions requiring the higher number of shared resources and a horizontal axis 1702 measuring the number of simultaneously active service sessions requiring the lower number of shared resources. In this example the "higher resource service" associated with the vertical axis 1701 requires approximately twice as many instances of real-time resource as the "lower resource service" associated with the horizontal axis 1702. As, in this representation, the sessions require integer-valued numbers of the shared computational resource the resulting possible states are shown as the lattice of dots 1751 inclusively bounded by the axes 1701, 1702 (where one or the other services has zero active sessions) and the constraint boundary 1704 on the total number of simultaneously available units of resource (here, units of simultaneous real-time computation power). As the "higher resource service" associated with the vertical axis 1701 requires approximately twice as many instances of real-time resource as the "lower resource service" associated with the horizontal axis 1702, the constraint boundary 1704 would be of the form 2Y+X=C wherein the constraint boundary 1704 intersects the horizontal axis 1702 at the value X=C (i.e., the system is serving C sessions of the "lower resource service") and also intersects the vertical axis 1701 at the value Y=C/2 (i.e., the system is serving C/2 sessions of the "higher resource service"). If, instead, an instance of the "higher resource service" required four times as much real-time computational resource as the "lower resource service," the constraint boundary 1704 would be of the form 4Y+X=C. If it used eight times as much, the constraint boundary 1704 would be of the form 8Y+X=C, etc., i.e. the slope of the constraint boundary 1704 gets increasingly less steep.

FIG. 17b illustrates a generalization of FIG. 17a to include a third service. In this view the dots of FIG. 17b are not shown but are assumed present and serve as elements of the three-dimensional state transition lattice. Here the region of permissible takes the form of a three-dimensional simplex with intercepts 1731, 1732, 1733 respectively at the three "active service instance count" axes 1761, 1762, 1763.

One of the results of sharing bandwidth between services with differing bandwidth requirements is that services requiring higher bandwidth per call or session will experience a higher blocking probability than services requiring lower bandwidth per call or session. This can be appreciated using the last example: two higher resource sessions require 16 units of resource. If there are more than 4 lower resource sessions active, less than 16 units of resource would be available.

Figure 18:
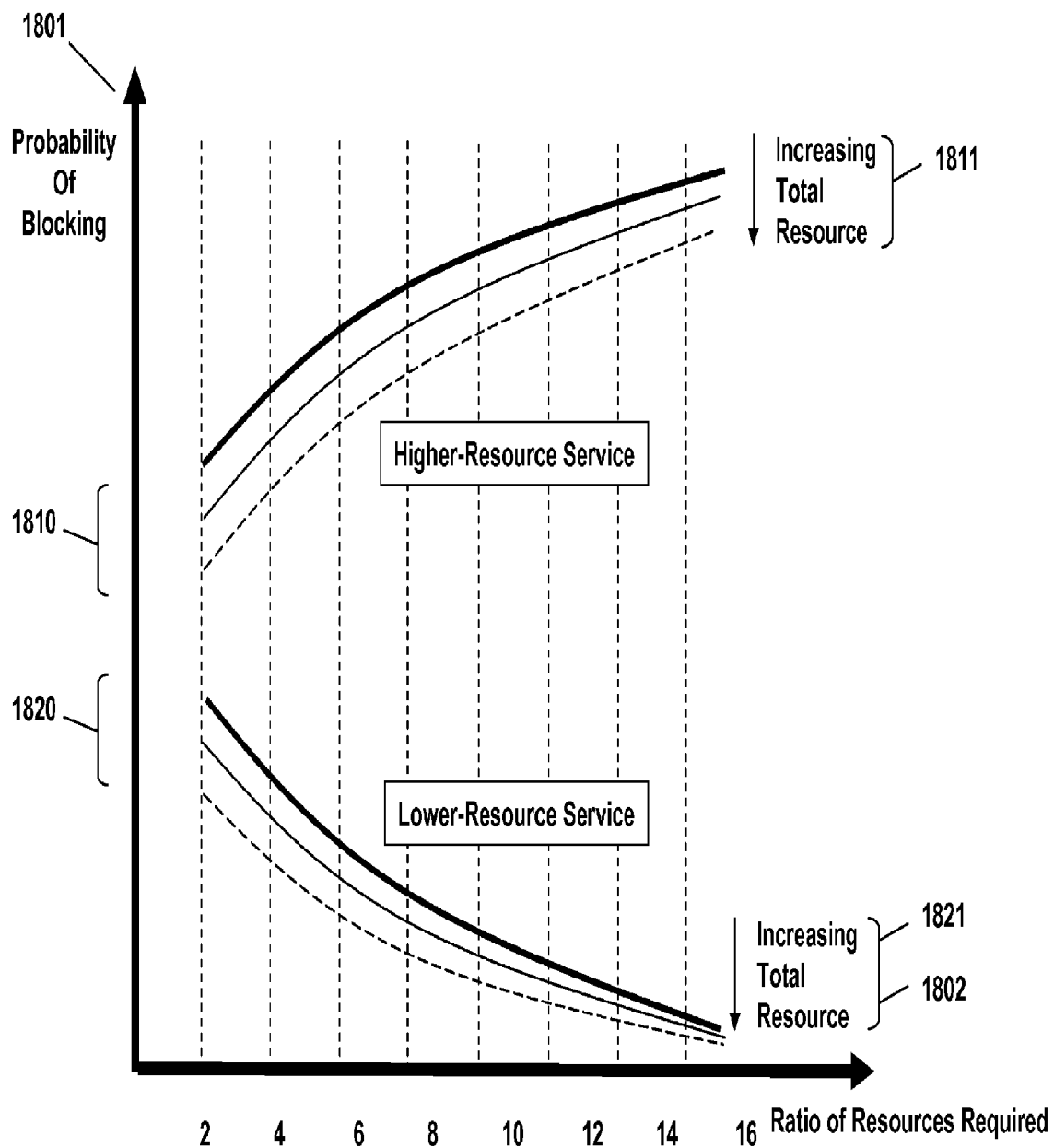
FIG. 18 illustrates examples of mixed bit-rate traffic call or session capacity blocking behaviors and their general structure for non-extreme ranges of parameters to each service.

The more general phenomenon is suggested by FIG. 18. FIG. 18 illustrates examples of cases where freely sharing bandwidth between services with differing bandwidth requirements results in the services requiring higher bandwidth per call or session will experience a higher blocking probability than services requiring lower bandwidth per call or session.

Details here also depend on relative service request arrival rates for each type of service, and although there are notable curve variations as well as pathologies and exceptions, FIG. 18 illustrates examples of mixed bit-rate blocking behaviors and their general structure for non-extreme ranges of parameters. Families of blocking probability curves are shown for the "higher-resource service" 1810 and "lower-resource service" 1820. For each family of curves, the blocking probability 1801 decreases 1811, 1812 with increasing numbers of total shared resource, as is almost always the case in shared resource environments. However, the two families of curves 1810, 1820 spread with increasing divergence as the ratio 1802 of resource required increases, showing an increasingly unfair advantage afforded to the "lower-resource service."

One way to make allocations and denials fairer, and in general have more predictable operation, is to impose minimum bandwidth allocations, such as, limit the number of resources that may be monopolized by any one service in the bandwidth sharing. This can be done by hacking away regions of the simplex of permitted shared bandwidth states.

Figure 19A:
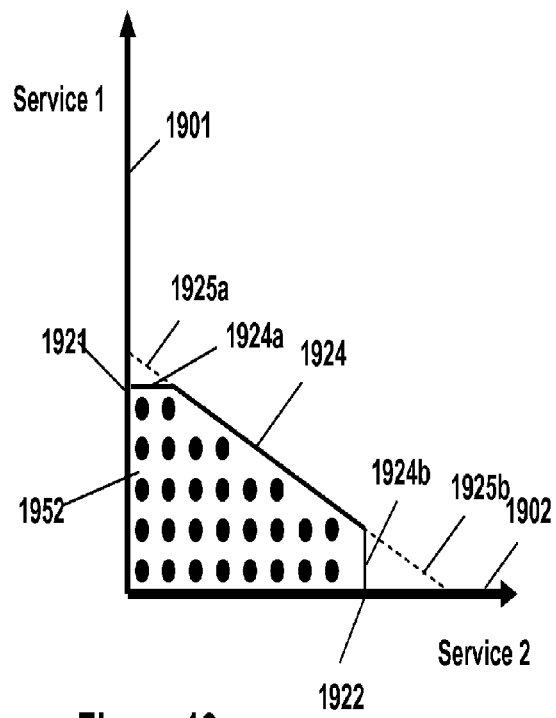
FIG. 19a illustrates the arrangement of FIG. 17a modified so as to include minimum bandwidth allocations to each service.
Figure 19B:
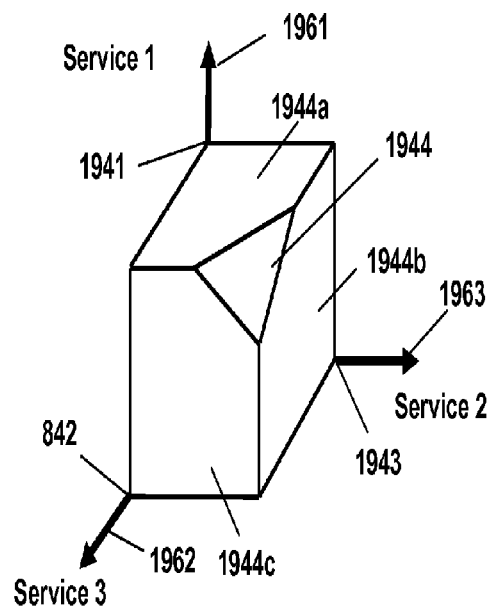
FIG. 19b illustrates the arrangement of FIG. 17b modified so as to include minimum bandwidth allocations.

FIG. 19a illustrates the arrangement of FIG. 17a modified so as to include minimum bandwidth allocations to each service. FIG. 19b shows a similar simplex truncation for the three-service example of FIG. 17b.

FIG. 19a shows truncation of the simplex of FIG. 17a that can be used to guarantee minimum bandwidth allocations for each service and thus reinstate fairness in a mixed bandwidth system that would otherwise exhibit the dynamics illustrated in FIG. 18. The constraint boundary 1704 for the full sharing in FIG. 17a has been replaced with a minimum bandwidth allocation boundary 1924, 1924a, 1924b truncating the states permitted by the original end-regions 1925a, 1925b associated with the 'open' policy with the minimum bandwidth allocation boundaries 1924a, 1924b corresponding to reservation levels 1921, 1922. These truncating minimum bandwidth allocation levels are dictated by the minimum bandwidth allocation constraints $2Y<Y.\text{sub.max}$ (for Y boundary 1925a at intercept 1921) and $8X<X.\text{sub.max}$ (for X boundary 1925b at intercept 1922).

These reservation constraints can be calculated from algebraic equations resulting from various fairness policies. This results in a non-triangular region of permissible states 1952. The reservation constraints depicted in the two-service case of FIG. 17b are relatively minor; more severe reservation effects are electively demonstrated in FIG. 19b. In particular, FIG. 19b shows the effect of reservations cutting off large portions of the open surface 1734 of the geometric simplex of FIG. 17b, resulting in truncation planes 1944a, 1944b, 1944c with intercepts 1941, 1942 and 1943. In this example, the reservations are so significant that only a small portion 1944 of the original open surface 1934 of the geometric simplex depicted in FIG. 17b remains. (In the limit, stringent reservations effectively eliminate resource sharing, transforming the region of permissible states into a cube whose outward vertex shares only one point with the original open surface 1934 of the simplex.)

To summarize, sharing services across multiple services with differing bandwidth, arrival rates, and duration statistics can readily be accounted for in the Kaufmann or related model by straightforward shifting of simplex vertices and renormalization of the remaining relative state transition probabilities. Fairness can be provided for by truncating the simplex in the manner described in FIGS. 19a-19b. As described earlier, these blocking probability algorithms may be inverted, at least through embedding the within blocking probability algorithms conditional counting loops. In an embodiment the resulting inverted formula algorithms can be used to calculate the bandwidth needed to ensure the blocking probabilities required for each service given the observed call or session arrival rates for each service. In an embodiment, the Kaufmann or related model can be used for "scratchpad" calculations for an algorithm or interactive user interface operated by an administrator to explore "what if" cases of various candidate admission policy situations.

With this foundation, the power of the geometric state space and simplex manipulation representation of bandwidth sharing and reservations comes directly into play. Shifting or truncating the simplexes is equivalent to simple manipulation of the limits of "DO-loops". The mathematics inherent in the model formulas handles everything else within a renormalization factor. The renormalization factor is directly computed by sequencing the "DO-loops" so as to sum every state transition probability among neighboring states within the simplex. These systems and methods to be incorporated in embodiments of the Unified Bandwidth Manager 110.

Unified Bandwidth Manager 110 can use these types of inverted blocking probability algorithms in various ways to automatically readjust the bandwidth carved out for each of the bandwidth reservation systems as a function of the traffic pattern observations. The simpler single-service Erlang and Engset inverted blocking probability algorithms can be used to estimate the bandwidth carve-out needed for a specified call or session request refusal rate (i.e. blocking probability) and traffic intensity.

Figures 20A, 20B:
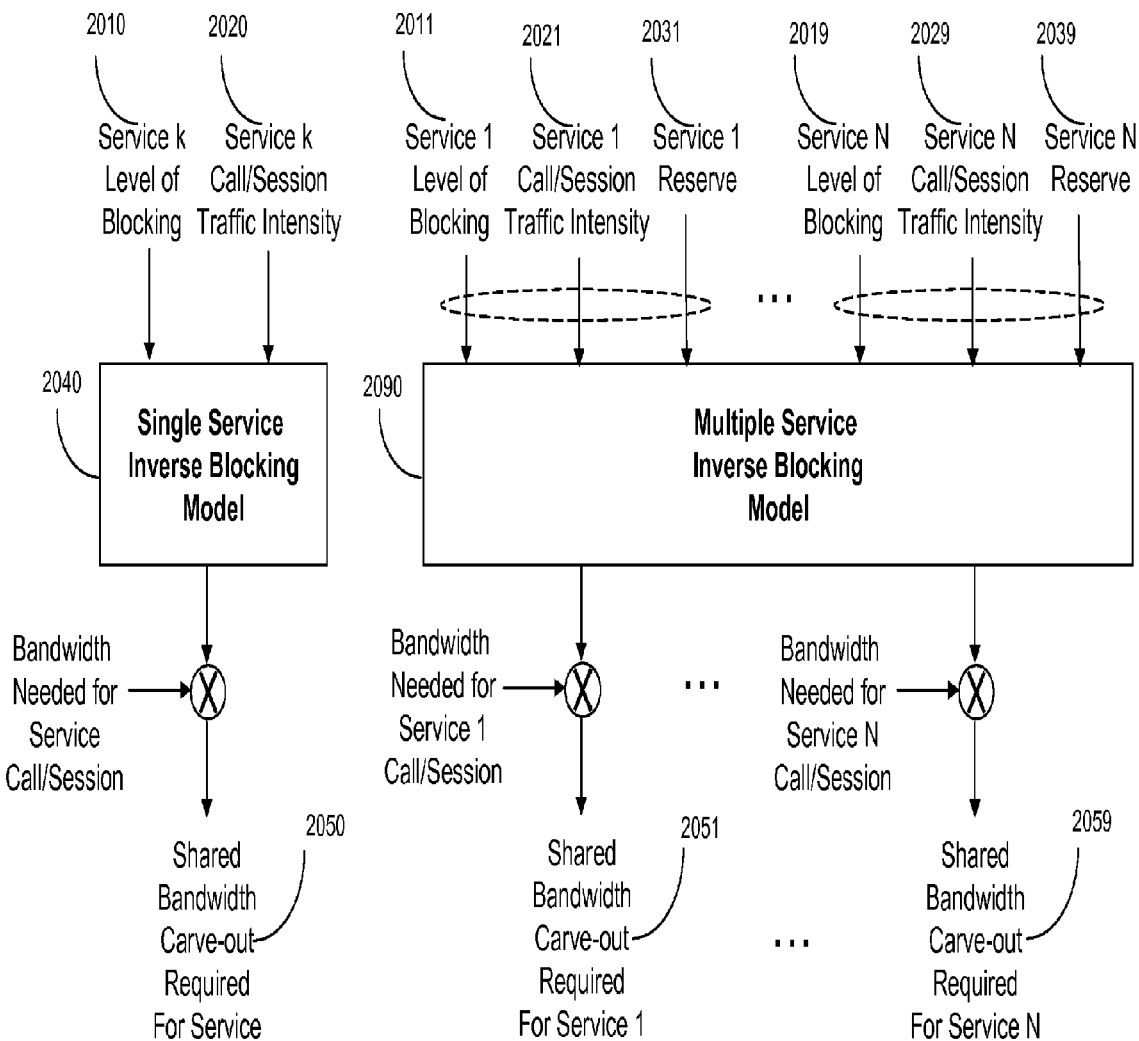

FIG. 20a shows how single service inverse blocking algorithm associated with FIGS. 17a and 19a can be used to emulate the real-world service experience provided by each individual bandwidth reservation system. FIG. 20a illustrates a flow chart for using this type of algorithm 2040 in this way.

With an instance of the arrangement of FIG. 20a for each service, the Unified Bandwidth Manager 110 can predict the amount of bandwidth 2050 each bandwidth reservation system in each of the FIG. 1 plurality of communication silos 130a-130n will require to be carved out given currently observed (or forward predicted) traffic intensity 2020 associated with that communication silo service for a specified level of blocking performance 2010.

FIG. 20b illustrates now a multiple service inverse blocking algorithm associated with FIGS. 17b and 19b can be used to emulate the real-world service experience provided by a bandwidth reservation system.

FIG. 20b shows an extension of the arrangement of FIG. 20a utilizing an algorithmic inversion 2090 of the Kelley/Kauffman multiple service blocking calculations described earlier. For each service, currently observed (or forward predicted) traffic intensity 2021-2029 and specified level of blocking performance 2011-2019 are specified. The multiple service algorithmic inversion 2090 provides the amount of bandwidth 2051-2059 each bandwidth reservation system in each of the FIG. 1 plurality of communication silos 130a-130n will require to be carved out. Additionally the multiple service algorithmic inversion 2090 provides the ability to guarantee minimum bandwidth allocations 2031-2039 to ensure fairness should that feature be useful to the Unified Bandwidth Manager feature set. Through mathematical manipulation these fairness settings can also be used in other contexts, including the maximum call bounds associated with each bandwidth reservation system.

The Unified Bandwidth Manager 110 can use these in various ways to internally calculate maximum bandwidth settings for each of the bandwidth reservation systems. One embodiment is depicted in FIG. 21.

Figure 21:
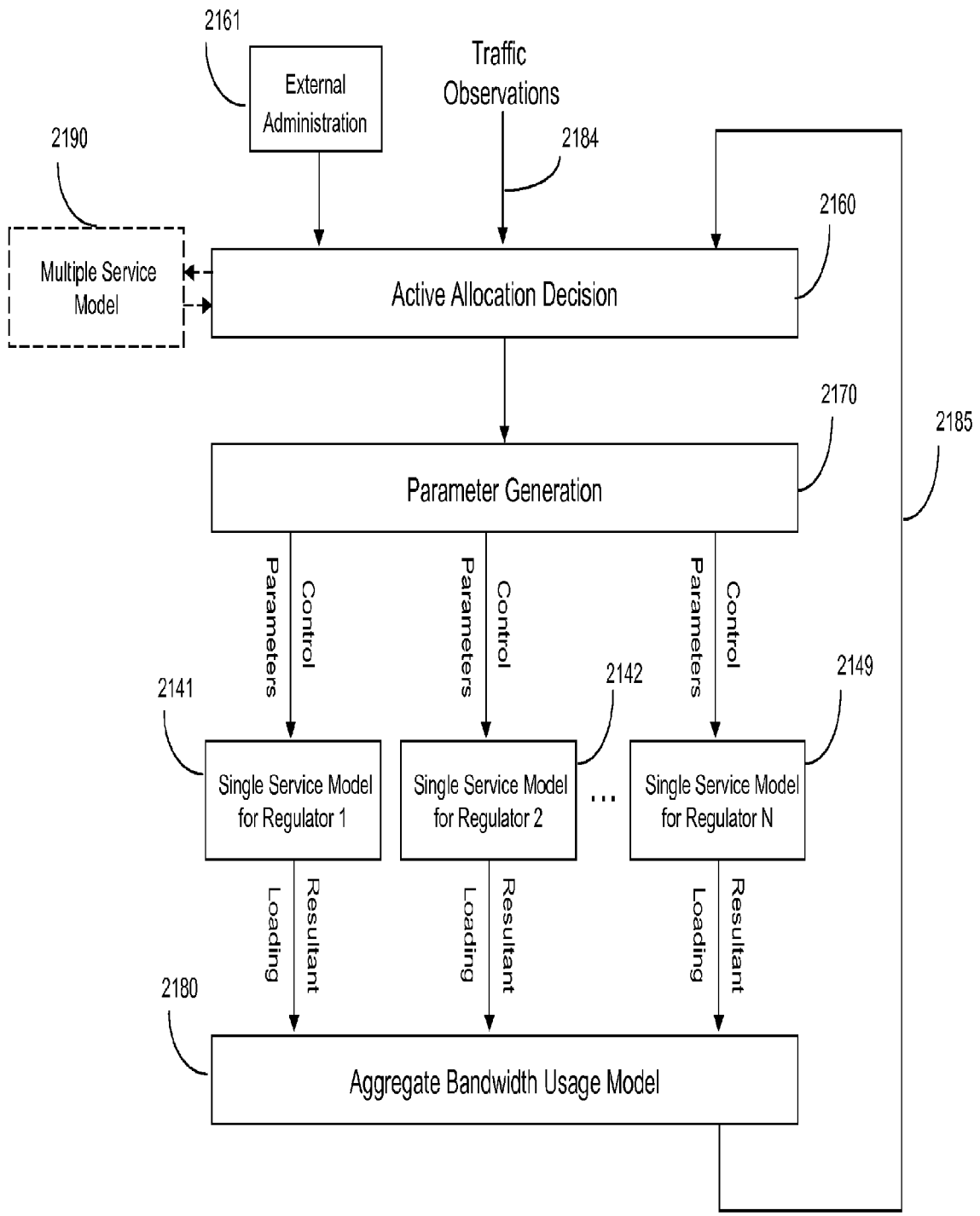
FIGS. 21 and 22 depict examples of ways the Unified Bandwidth Manager can internally calculate maximum call and session admission settings for each of the bandwidth reservation systems.

FIG. 21 depicts an example of ways the Unified Bandwidth Manager 110 can internally calculate maximum call and session admission settings for each of the bandwidth reservation systems.

Here, an allocation module 2160 may obtain information 2184 from traffic observations, information 2184 from an aggregate bandwidth allocation usage model 2180, and external administration information 2184. Trial high-level allocation decisions are directed to a parameter generation module 2170 that provides parameters suitable to send to the bandwidth reservation systems. These control parameter settings are instead sent to single service models 2141-2149 of the bandwidth reservation systems. These are as described in conjunction with FIG. 20a, and produce the resulting bandwidth requirement loads they need to guarantee their associated performance levels. These resulting bandwidth requirement loads are combined, potentially with other model outputs and considerations, in the aforementioned aggregate bandwidth allocation usage model 2180.

In some embodiments, the allocation module 2160 may interact with the multiple service model 2190 so as to include broader inter-service interaction effects and fairness-oriented considerations in the allocation decisions made by the allocation model 2160.

Figure 22:
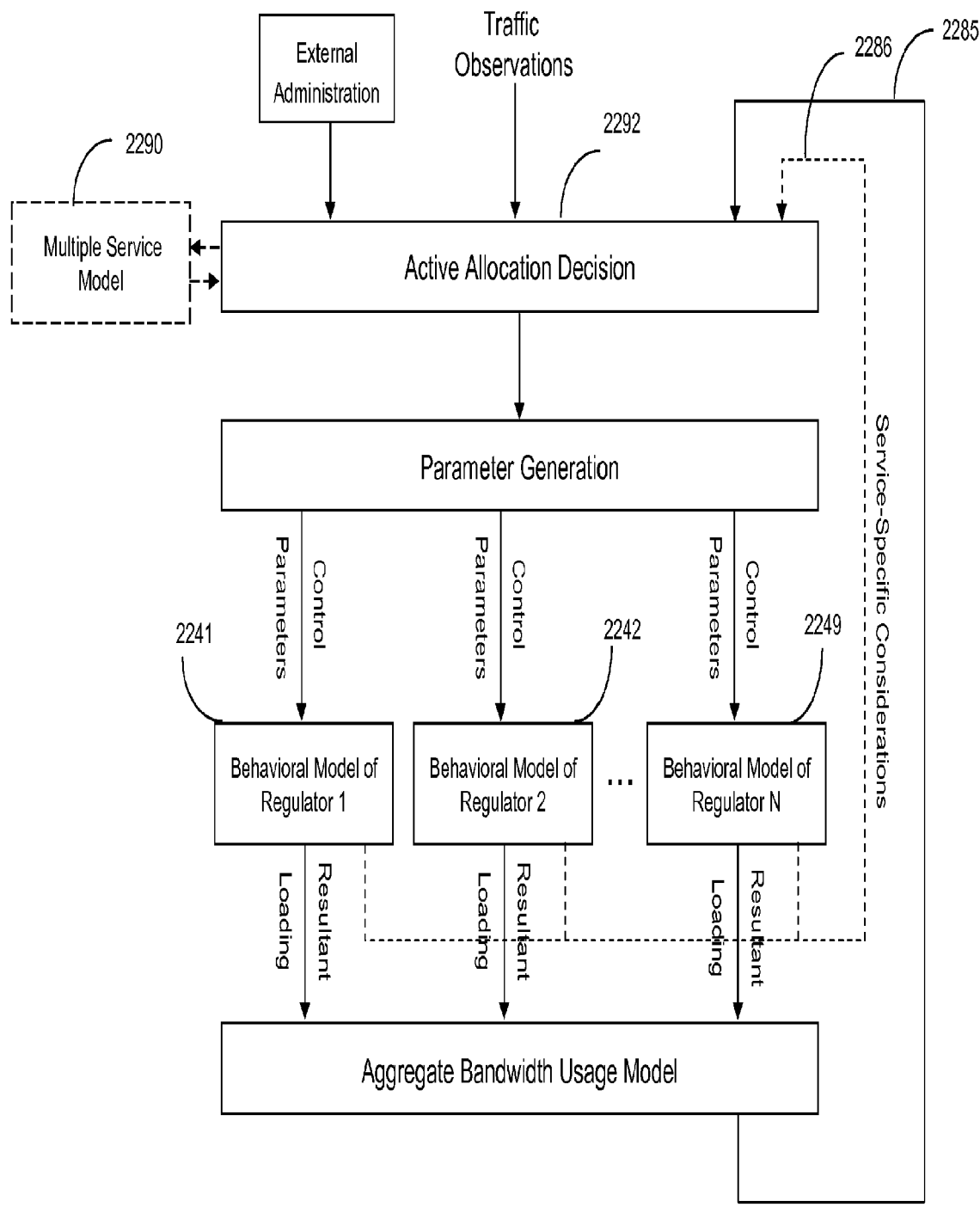

FIG. 22 depicts an embodiment of ways for the Unified Bandwidth Manager to internally calculate maximum bandwidth settings for each of the bandwidth reservation systems. FIG. 22 depicts a variation of the arrangement of FIG. 21 wherein behavioral models 2241, 2242 and 2249 have been enhanced with additional service-specific attributes and which pass additional service-specific considerations 2286 to the allocation decision module 2292.

In some embodiments, allocation decision module 2292 is similar to allocation module 2160, except it additionally includes any of the following additional components and methods: empirical predictors for traffic variations (trend based, time-of-day based, event based, etc.), empirical behavior models for unknown dynamics of a bandwidth reservation system product, topological considerations regarding specific communication Links and Site networks, failure handling, recovery, and post-failure allocation, topological call-based routing, and merger of like communications silos and associated traffic that are segregated into separate administrative domains.

Functions of the Unified Bandwidth Manager

With the bandwidth allocation functionality thus addressed, attention is directed to these and other additional functions that may be provided by various embodiments of the Unified Bandwidth Manager 110.

In some embodiments, the Unified Bandwidth Manager 110 includes one or more of traffic predictors and empirical behavior models for unknown dynamics of bandwidth reservation system products. Empirical predictors for traffic variations (trend based, time-of-day based, event based, etc.) are known in the art. These may comprise formal system estimation and/or time-series models. In some embodiments, the Unified Bandwidth Manager 110 includes various forms of these.

Empirical behavior models for unknown internal dynamics of a dynamical system are known in the art. These may be applied to estimating the unknown internal dynamics of a bandwidth reservation system product. In some embodiments, the Unified Bandwidth Manager 110 includes various forms of these.

Architectural Variations

For whatever selected collection of systems and methods may be chosen for a particular embodiment of the Unified Bandwidth Manager and its associated environment, a wide variety of architectural implementations may be employed in realizing it.

Figure 27:
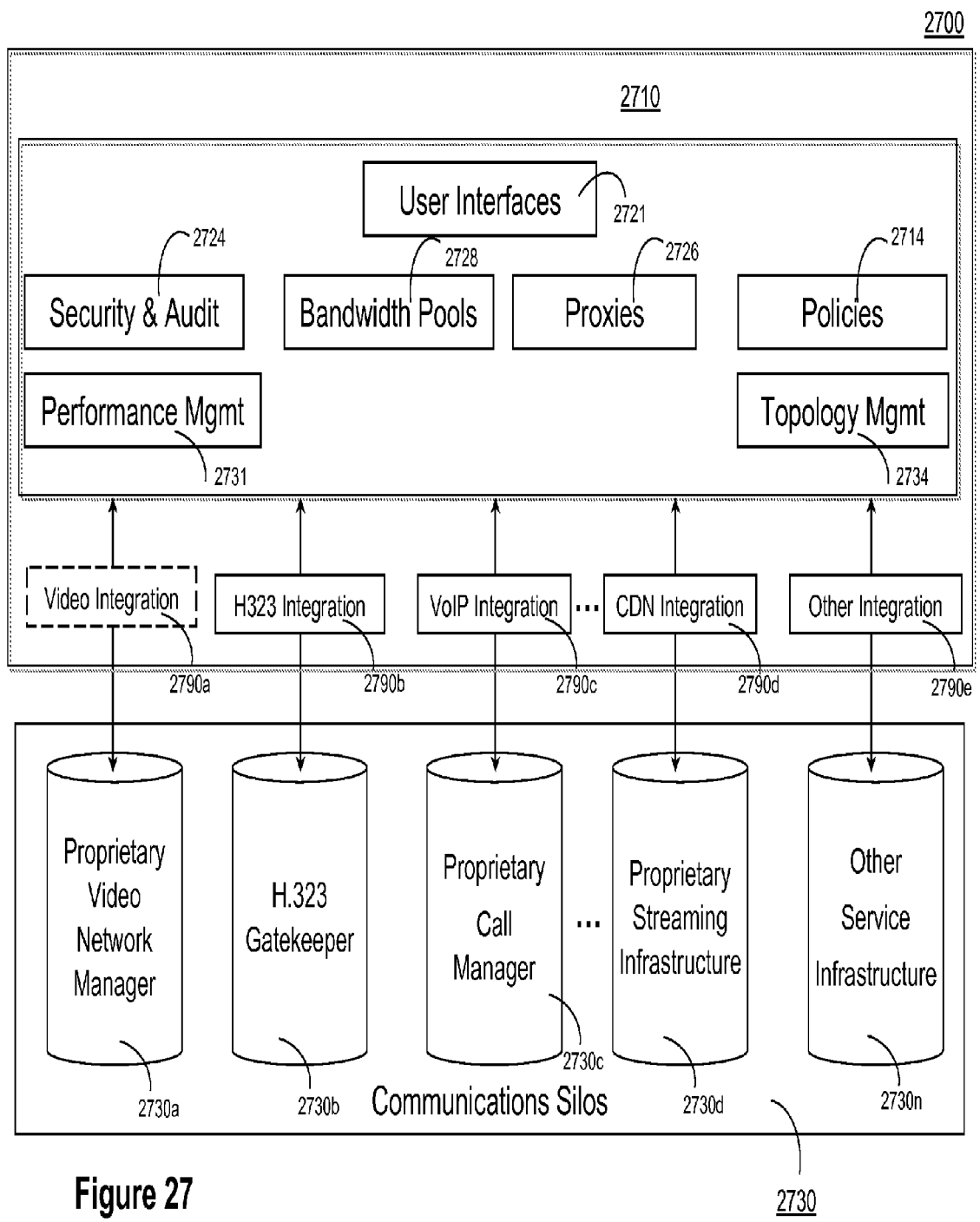
FIGS. 27 and 28 are respective block diagrams of a Unified Bandwidth Manager and an enterprise networking environment in which it may operate.

FIG. 27 shows an alternate embodiment of an enterprise networking environment 2700 including a Unified Bandwidth Manager 2710, and communication silos 2730 containing bandwidth reservation systems. The architecture of FIG. 27 is similar to that shown in FIG. 1, except that in the embodiment illustrated in FIG. 27, several of the internal Unified Bandwidth Manager functions depicted in FIG. 1 are aggregated into integration modules 2790.

Figure 28:
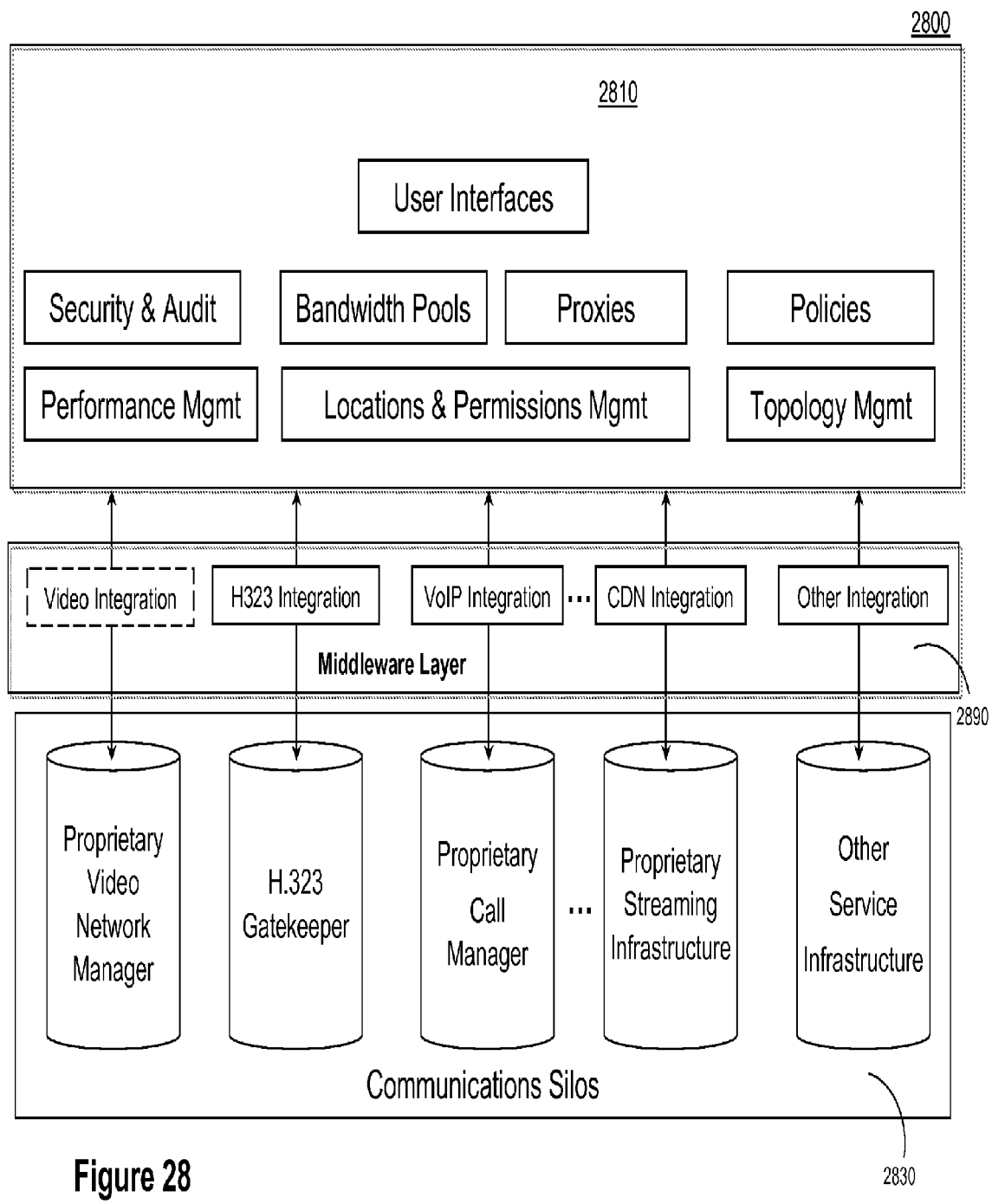

FIG. 28 shows an alternate embodiment of an enterprise networking environment 2800 including a Unified Bandwidth Manager 2810, and communication silos 2830 containing bandwidth reservation systems. The architecture of FIG. 28 is similar to that shown in FIG. 27, except that the integration modules of FIG. 27 have been excised from the Unified Bandwidth Manager 2810 into a "middleware layer" functionally 2890 residing between the remaining functions of the Unified Bandwidth Manager 2810 and the various communications silos 2830 of FIGS. 1 and 27.

Figure 29:
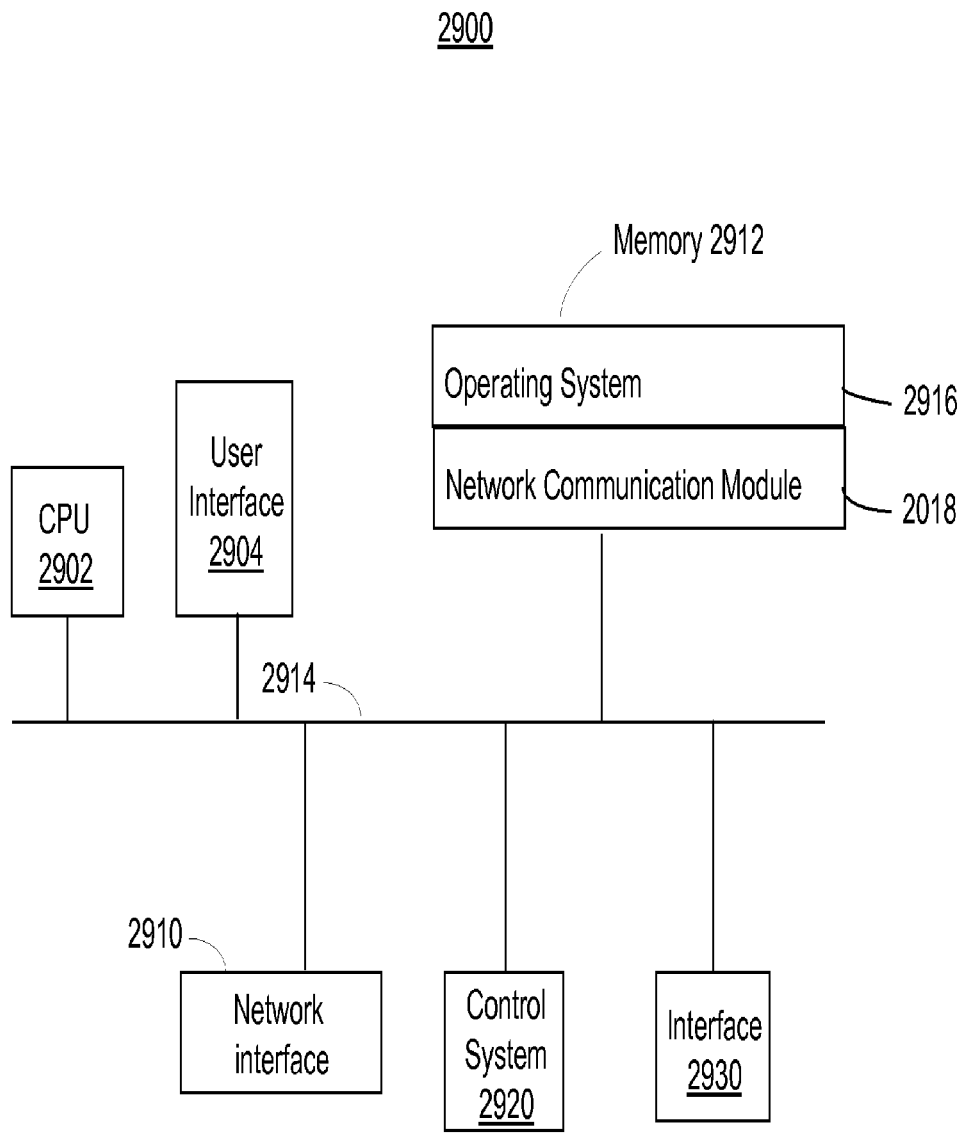
FIG. 29 is a block diagram of a Unified Bandwidth Manager.

FIG. 29 is a block diagram of supporting hardware and software systems for implementing a Unified Bandwidth Manager 2900. The Unified Bandwidth Manager 2900 generally includes one or more processing units (CPU's) 2902, one or more network or other communications interfaces 2910, memory 2912, and one or more communication buses 2914 for interconnecting these components. The communication buses 2914 may include circuitry (sometimes called a chipset) that interconnects and controls communications between system components. Unified Bandwidth Manager 2900 may optionally include a user interface 2904, such as one or more displays, pointing device (such as a mouse), and a keyboard.

Unified Bandwidth Manager 2900 includes a control system 2920 that is provided with a plurality of feedback inputs. The control system 2920 uses the plurality of feedback inputs, together with at least one of policy information and goal information, to produce at least one element of outgoing control information. In some embodiments, control system 2920 is responsive to both policy information and goal information. In some embodiments, control system 2920 internally comprises a hierarchical structure for implementing the responsiveness to both policy information and goal information.

Unified Bandwidth Manager 2900 includes an interface 2930 for providing at least one of policy information or goal information to the control system 2920. In some embodiments, interface 2930 may be implemented as a user application with a graphical user interface.

Memory 2912 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 2912 may optionally include one or more storage devices remotely located from the CPU(s) 2902. Memory 2912, or alternately the non-volatile memory device(s) within memory 2912, comprises a computer readable storage medium. In some embodiments, memory 2912 stores the following programs, modules and data structures, or a subset thereof: [0214] an operating system 2916 that includes procedures for handling various basic system services and for performing hardware dependent tasks; [0215] a network communication module 2918 that is used for connecting the geometry detector 2900 to other computers via the one or more communication network interfaces 2910 (wired or wireless) and one or more communication networks, such as the Internet, other wide area networks, local area networks, metropolitan area networks, and so on.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 312 may store a subset of the modules and data structures identified above. Furthermore, memory 312 may store additional modules and data structures not described above.

Although FIG. 29 shows a Unified Bandwidth Manager 2900, FIG. 29 is intended more as functional description of the various features which may be present in a Unified Bandwidth Manager than as a structural schematic of the embodiments described herein. In practice, and as recognized by those of ordinary skill in the art, items shown separately could be combined and some items could be separated. For example, multiple CPUs or distributed storage could be employed.

Each of the methods described herein may be governed by instructions that are stored in a computer readable storage medium and that are executed by one or more processors of one or more servers or clients. For example, each of the operations shown in FIGS. 12-15, 20a, 20b, 22, and 22 may correspond to instructions stored in a computer memory or computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system for unified bandwidth management in a communications network supporting a plurality of services, the communication network having a plurality of network conditions and interfacing with a plurality of service-specific bandwidth managers, each service-specific bandwidth manager comprising an associated resource controller, the system comprising:
 a unified bandwidth manager including a control system, the control system comprising at least a policy control system and a goal control system, and an interface for providing at least one of policy information and goal information to the control system;
 a control interface to each of the service-specific bandwidth managers, each control interface providing an ability for the bandwidth manager to control at least one aspect of the associated service-specific bandwidth managers, each service-specific bandwidth manager affecting at least one associated network condition of an associated network resource;
 at least one service-specific observation element associated with one of the service-specific bandwidth managers, the observation reporting element providing first observation information to the bandwidth manager responsive to at least one network condition imposed the associated network resource by the associated the service-specific bandwidth manager;
 at least one network monitor observation element providing second observation information to the bandwidth manager, the second observation information responsive to at least one network condition observed in the associated network resource;
 wherein the control system is provided with a plurality of feedback inputs that are responsive to associated first and second observation information;
 wherein the control system uses the plurality of feedback inputs, together with the at least one policy information and goal information, to produce outgoing control information,
 wherein the outgoing control information is conveyed to at least one of the service-specific bandwidth managers using the associated control interface, and
 wherein the conveyed outgoing control information is used by the resource controller associated with the at least one service-specific bandwidth manager.

2. The system of claim 1, wherein the first observation reporting element comprises an observation information interface to one service-specific bandwidth manager.

3. The system of claim 2, wherein the observation information interface utilizes a file.

4. The system of claim 2, wherein the observation information interface utilizes an API.

5. The system of claim 2, wherein the observation information interface utilizes a data stream.

6. The system of claim 1, wherein the second observation reporting element comprises a network monitor separate from the service-specific bandwidth managers.

7. The system of claim 1, wherein the control interface utilizes a file.

8. The system of claim 1, wherein the control interface utilizes an API.

9. The system of claim 1, wherein the control interface utilizes a data stream.

10. The system of claim 1, wherein the control system utilizes a multi-service stochastic process blocking calculator.

11. The system of claim 1, wherein the control system is responsive to both policy information and goal information.

12. The system of claim 11, wherein the control system comprises a hierarchical structure for implementing the responsiveness to both policy information and goal information.

13. The system of claim 1, wherein at least one of the service-specific bandwidth managers controls the admissions of Voice over IP calls.

14. The system of claim 1, wherein at least one of the service-specific bandwidth managers controls the admissions of video conferencing calls.

15. The system of claim 1, wherein at least one of the service-specific bandwidth managers controls the admissions of at least one of audio streaming sessions and video streaming sessions.

16. The system of claim 1, wherein at least one of the service-specific bandwidth managers controls the admissions of server access sessions.

17. The system of claim 1, wherein at least one of the service-specific bandwidth managers controls the admissions of database transactions.

18. The system of claim 1, wherein at least one of the service-specific bandwidth managers controls the bandwidth allowed in admitted calls.

19. The system of claim 1, wherein at least one of the service-specific bandwidth managers controls the bandwidth allowed in admitted streaming sessions.

20. The system of claim 1, wherein the unified bandwidth manager manages at least one network condition according to the at least one policy information and goal information.

* * * * *